United States Patent
Slaven et al.

(10) Patent No.: US 10,465,402 B2
(45) Date of Patent: Nov. 5, 2019

(54) ASSEMBLY OF A PLATFORM ASSEMBLY AND SUPPORT STRUCTURE AND METHOD OF ASSEMBLY

(71) Applicant: SpanSet Inter AG, Wollerau (CH)

(72) Inventors: John P. Slaven, Manchester (GB); Peter John Ward, Flintshire (GB)

(*) Notice: Subject to any disclaimer, the term of this patent is extended or adjusted under 35 U.S.C. 154(b) by 0 days.

(21) Appl. No.: 15/552,913

(22) PCT Filed: Feb. 23, 2016

(86) PCT No.: PCT/EP2016/053786
§ 371 (c)(1),
(2) Date: Aug. 23, 2017

(87) PCT Pub. No.: WO2016/135149
PCT Pub. Date: Sep. 1, 2016

(65) Prior Publication Data
US 2018/0044932 A1 Feb. 15, 2018

(30) Foreign Application Priority Data
Feb. 23, 2015 (GB) .................... 1503002.6

(51) Int. Cl.
*E04G 21/32* (2006.01)
*E04G 1/15* (2006.01)
(Continued)

(52) U.S. Cl.
CPC .......... *E04G 21/3266* (2013.01); *E04G 1/15* (2013.01); *E04G 1/153* (2013.01); *E04G 3/20* (2013.01);
(Continued)

(58) Field of Classification Search
CPC .... E04G 3/30; E04G 3/20; E04G 1/15; E04G 1/153; E04G 7/04
See application file for complete search history.

(56) References Cited

U.S. PATENT DOCUMENTS

| | | | | |
|---|---|---|---|---|
| 2,399,681 A | * | 5/1946 | Kemner | .................... E04G 7/04 403/176 |
| 3,527,319 A | | 9/1970 | Pedley | |

(Continued)

FOREIGN PATENT DOCUMENTS

| | | |
|---|---|---|
| GB | 1244391 A | 9/1971 |
| GB | 2408770 A | 6/2005 |

(Continued)

OTHER PUBLICATIONS

International Search Report and Written Opinion, PCT/EP2016/053786, dated Aug. 9, 2016, 17 pages.
(Continued)

*Primary Examiner* — Paola Agudelo
(74) *Attorney, Agent, or Firm* — Taft Stettinius & Hollister LLP

(57) ABSTRACT

An assembly of a platform assembly and a support structure, the platform assembly comprising a flexible platform, a plurality of support straps arranged to support the platform, a plurality of clamps supported by the support structure, the plurality of clamps provided along a side of the platform and clamping a side section of the platform, and a plurality of tensioning devices attached to the support straps at attachment locations and arranged to tension the support straps, wherein the attachment locations of the tensioning devices are positionable independently of the position of the clamps, and a method of assembly. A clamp having first and second clamping members having clamping surfaces, an actuation assembly comprising an actuation member coupled to at least one clamping member such that rotation of the actuation member, about a rotational axis, in a first rotational direction rotates the first and second clamping members relative to each other, wherein for a certain rotational position of the actuation member, the actuation member is moveable in a first axial direction relative to at least one (Continued)

clamping member and is coupled to the at least one clamping member such that said relative movement acts to urge the clamping surfaces closer together.

20 Claims, 33 Drawing Sheets

(51) Int. Cl.
    *E04G 3/20*         (2006.01)
    *E04G 3/30*         (2006.01)
    *E04G 7/26*         (2006.01)
    *F16B 2/10*         (2006.01)

(52) U.S. Cl.
    CPC ................ *E04G 3/30* (2013.01); *E04G 7/26* (2013.01); *F16B 2/10* (2013.01)

(56) References Cited

U.S. PATENT DOCUMENTS

| | | | |
|---|---|---|---|
| 5,197,239 A * | 3/1993 | Glynn | E04G 5/12 52/63 |
| 5,579,610 A * | 12/1996 | Jackson | A01G 20/30 52/4 |
| 5,787,955 A * | 8/1998 | Dargie | E02D 29/12 160/368.1 |
| 5,795,267 A | 8/1998 | Weaver | |
| 5,984,837 A | 11/1999 | Weaver et al. | |
| 6,068,085 A | 5/2000 | Denny et al. | |
| 6,155,743 A * | 12/2000 | Chen | F16B 7/1418 248/161 |
| 6,161,648 A * | 12/2000 | Rexroad | A62B 1/22 182/138 |
| 2002/0020584 A1* | 2/2002 | Cjepa | A62B 1/22 182/138 |
| 2008/0000056 A1* | 1/2008 | Murray | A47H 23/01 24/460 |
| 2009/0159369 A1* | 6/2009 | McCarthy | E04G 3/20 182/222 |
| 2011/0302868 A1* | 12/2011 | Heaney | E01D 19/125 52/582.1 |
| 2016/0102725 A1* | 4/2016 | Slaven | A62B 35/04 248/636 |

FOREIGN PATENT DOCUMENTS

| | | |
|---|---|---|
| WO | 2007092984 A1 | 8/2007 |
| WO | 2009117758 A1 | 10/2009 |
| WO | 2011063457 A1 | 6/2011 |

OTHER PUBLICATIONS

Search Report under Section 17(5), United Kingdom Patent Application No. GB1503002.6, dated Aug. 18, 2015, 5 pages.
Partial Search Report, International Patent Application No. PCT/EP2016/053786, dated May 20, 2016, 8 pages.

* cited by examiner

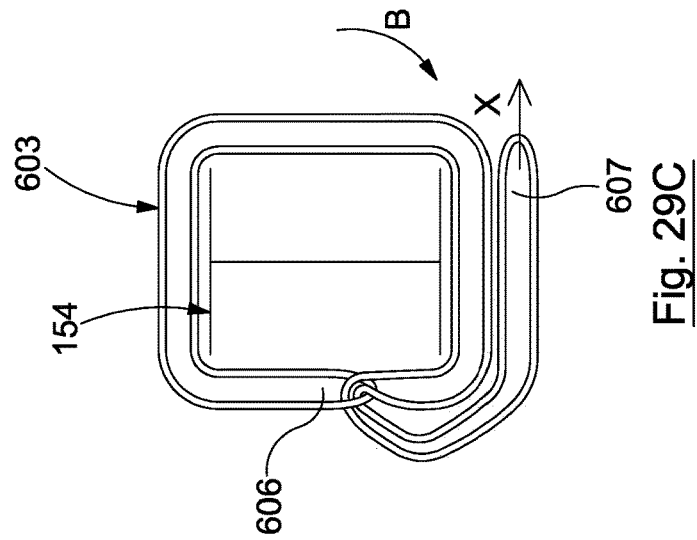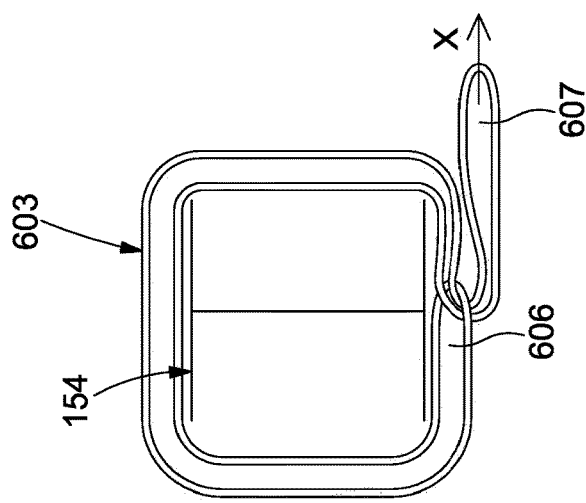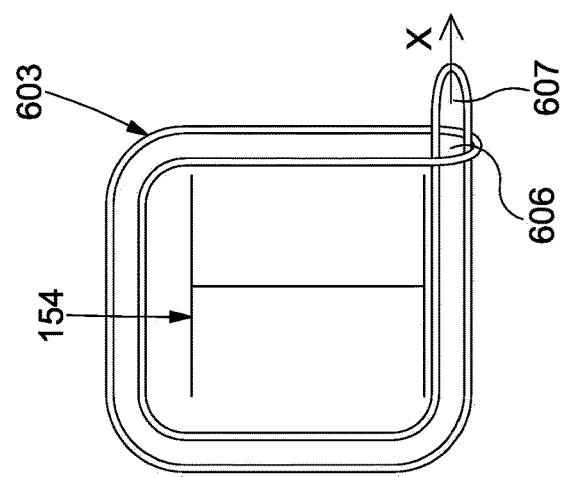

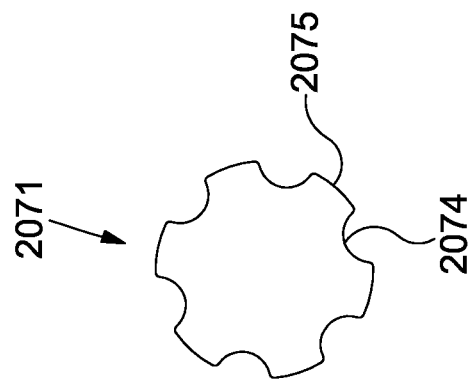
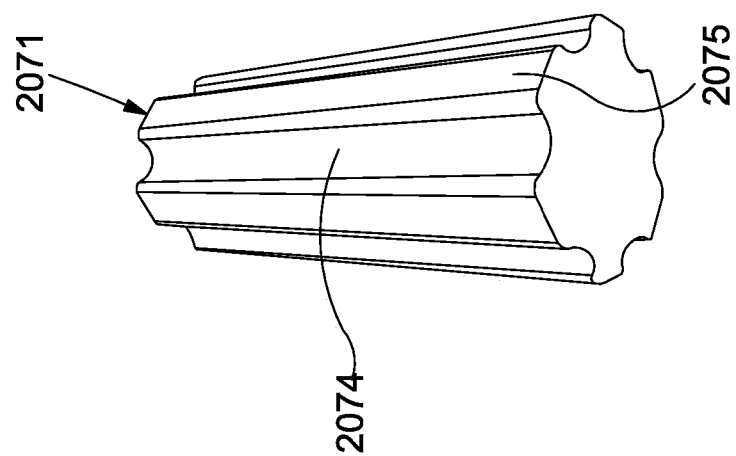

ASSEMBLY OF A PLATFORM ASSEMBLY AND SUPPORT STRUCTURE AND METHOD OF ASSEMBLY

The present invention relates to an assembly of a platform assembly and a support structure to provide a load bearing platform assembly supported by the support structure. Specifically, but not exclusively, the assembly of the platform assembly and support structure is for use on a building or on a construction site to provide an elevated load bearing temporary platform for maintenance or construction workers. The present invention also relates to a method of assembly of a platform assembly and a support structure. The present invention also relates to a clamp and clamp assembly for use in a platform assembly.

On a building construction site it is known to provide an elevated support platform to act as a floor for construction workers to walk across and work on the building from. The platform is formed by a plurality of support straps that are arranged in a grid and extend across the area defined between opposed structural members, in the longitudinal and lateral directions. The grid of straps forms a base structure on which a flexible mesh of material is supported. This provides a platform for construction workers to move around at an elevated height.

The straps are typically tensioned, towards at least one end of the straps, with a tensioning device, such as a ratchet tensioner. In order to be able to provide a sufficient tensioning force on the straps, it is generally necessary for the tensioning device to be attached to the straps at a certain minimum distance inboard of a structural member to which the tensioning device is attached. This is in order to provide enough room for the straps to be stretched in the outboard direction to provide the desired tension.

This leaves an unsupported section between the point at which the support straps are attached to the tensioner and the structural member. There is also typically a gap between a side of the mesh, adjacent the structural member, and the structural member which presents both a safety hazard and is aesthetically displeasing. Furthermore, there is typically slack in the mesh towards the side of the mesh adjacent the structural member. Accordingly, if a person stands on a section of the mesh adjacently inboard of where the support straps are attached to the tensioner, the weight of the person can force this section of the mesh downwardly between the support straps. As a result the person can sink between the support straps, causing a dangerous hazard.

It is one object of the present invention to obviate or mitigate one or more of the aforesaid disadvantages. It is also an object of the present invention to provide for an improved or alternative assembly of a platform assembly and a support structure.

According to a first aspect of the invention there is provided an assembly of a platform assembly and a support structure, the platform assembly comprising a flexible platform, a plurality of support straps arranged to support the platform, a plurality of clamps supported by the support structure, the plurality of clamps provided along a side of the platform and clamping a side section of the platform, and a plurality of tensioning devices attached to the support straps at attachment locations and arranged to tension the support straps, wherein the attachment locations of the tensioning devices are positionable independently of the position of the clamps.

The feature that the clamps are positionable independently of where the tensioning devices are attached to the support straps is advantageous in that the platform may be attached closer to the support structure than would otherwise be possible. This prevents, or reduces, any gap that would otherwise be present between the side of the platform and the support structure.

In addition, the clamping of the platform can remove slack in the platform, towards this side of the platform, thereby preventing a worker from sinking between adjacent support straps.

Furthermore, the tension in the straps and in the flexible platform can be adjusted independently of each other. This is advantageous since it is generally desirable that the platform is held taut (under relatively low tension) and that the straps are under a relatively high tension to provide an underlying support structure for the platform.

In addition, this arrangement provides for greater flexibility in the shape of the platform that can be attained.

Optionally each tensioning device does not clamp the platform.

Optionally each clamp does not tension the support straps.

Optionally the tensioning devices are attached to the support structure.

Optionally the clamps are attached to the same side of the support structure as the tensioning devices.

Optionally the clamps are positioned closer to said side of the support structure than the attachment locations of the tensioning devices. Optionally at least one clamp is positioned closer to said side of the support structure that at least one attachment location of a tensioning device. Optionally each clamp is positioned closer to said side of the support structure that each attachment location of the tensioning devices.

Optionally the platform extends across a space between different sides of the support structure. Optionally the platform extends across a space between opposed sides of the support structure. The platform may be substantially horizontal or may be inclined relative to the horizontal direction. Optionally at least a section of the platform is folded to form a folded section, the folded section forming the side section of the platform that is clamped by the plurality of clamps.

Optionally the folded section is folded over or under the remainder of the platform. In this respect, one or more of the clamps may be provided above or below the platform respectively. One or more of the clamps may be oriented upside down so that the folded section is folded under the remainder of the platform.

Optionally the folded section is folded in the inboard direction. Optionally the folded section defines a peripheral side of the platform that is inboard of the side of the support structure.

Optionally the peripheral side of the platform defined by the folded section is proximal to the side of the support structure.

Optionally the peripheral side of the platform defined by the folded section has a shape that is complimentary to that of the side of the support structure.

Optionally the peripheral side of the platform defined by the folded section extends along a longitudinal axis that is substantially parallel to a longitudinal axis of said side of the support structure.

Optionally the peripheral side of the platform defined by the folded section is closer to said side of the support structure than the tensioning devices. Optionally the peripheral side of the platform defined by the folded section is closer to said side of the support structure than the attachment locations of the tensioning devices.

Said peripheral side may be straight, curved or part-curved.

Optionally each support strap is attached to the support structure by an anchor member that provides a reaction force to the force exerted on the support strap by a said tensioning device. Optionally each support strap is attached to a first side of the support structure by a said tensioning device and is attached to a second side of the support structure by a said anchor member. The anchor member may be a sling, eye bolt, or any other suitable anchor member. Optionally each support strap is attached to a first and second said tensioning device at first and second attachment locations respectively, the first and second tensioning devices being attached to first and second sides of the support structure respectively and arranged to apply opposed forces on the strap so as to tension the strap.

The first and second sides of the support structure may be opposed sides of the support structure.

Optionally the plurality of clamps form a plurality of sets of clamps, each set of clamps being supported by a respective side of the support structure and being provided along a respective side of the platform and clamping a respective side section of the platform.

Optionally a plurality of sections of the platform are folded to form respective folded sections, each folded section forming a respective side section of the platform that is clamped by a respective set of clamps.

Optionally the plurality of folded sections are on opposed sides of the platform.

Optionally the plurality of clamps form a plurality of sets of clamps, each set of clamps being supported by a respective side of the support structure and being provided along a respective side of the platform and clamping a respective side section of the platform, and wherein the plurality of tensioning devices form a plurality of sets of tensioning devices, attached to the support straps at attachment locations and arranged to tension the support straps, each set of clamps being attached to the same side of the support structure as a set of tensioning devices, wherein the attachment locations of the tensioning devices of each set are positionable independently of the position of the clamps of the set of clamps that is attached to the same side of the support structure.

Optionally a first set of clamps and tensioning devices is attached to a first side of the support structure and a second set of clamps and tensioning devices is attached to a second side of the support structure, wherein the first and second sides of the support structure are opposed to each other.

Optionally the first and second sides of the support structure are inclined relative to each other.

Optionally each clamp comprises first and second clamping surfaces and a grip member disposed between the first and second clamping surfaces, the first and second clamping surfaces being movable relative to each other so as to selectively clamp the respective side section of the platform between the first and/or second clamping surfaces and a peripheral surface of the grip member. The platform may be in contact with the first and/or second clamping surfaces. The platform may be in contact with an insert disposed between the grip member and the first and/or second clamping surfaces.

Optionally the side section of the platform passes at least party around the circumference of the grip member. Optionally the side section of the platform passes around at least 50% of the circumference of the grip member. Optionally the side section of the platform passes around at least 75% of the circumference of the grip member. Optionally the side section of the platform passes around at least 90% of the circumference of the grip member.

Optionally the peripheral surface of the grip member is arcuate. Optionally the grip member has a peripheral surface of a substantially constant radius. Optionally the grip member is elongate.

Optionally the peripheral surface of the grip member has a complimentary shape to the combined shape of the first and second clamping surfaces when the side section of the platform is clamped between said first and/or second clamping surfaces and the peripheral surface of the grip member.

Optionally the platform assembly comprises a plurality of said grip members, with each grip member being received within a respective clamp such that the first and second clamping surfaces of that clamp are movable relative to each other so as to selectively clamp the side section of the platform between the first and/or second clamping surfaces and the grip member.

Optionally at least one of the grip members is received within more than one of said clamps that, for each of those clamps, their first and second clamping surfaces are movable relative to each other so as to selectively clamp the side section of the platform between the first and/or second clamping surfaces and the grip member.

Optionally the peripheral surface of the grip member and/or the first and/or second clamping surfaces has a coefficient of friction that is greater than the coefficient of friction of the platform.

Optionally the peripheral surface of the grip member and/or the first and/or second clamping surfaces and/or the platform is provided with a coating to increase its coefficient of friction.

Optionally an insert of material is provided between the grip member and the platform and/or between the platform and the first and/or second clamping surfaces, the insert of material having a higher coefficient of friction than at least one of said respective surfaces that it is provided between.

Optionally the coating and/or insert is Neoprene rubber, Secutex polyurethane or any other suitable high friction material.

Optionally each clamp is arranged to hold the section of the platform in place using only a frictional force exerted on the section of the platform.

Optionally each clamp is arranged to hold the section of the platform in place without penetrating the section of the platform.

Optionally a single layer of the platform is clamped between the first and/or second clamping surfaces and the peripheral surface of the grip member.

Optionally a section of the platform received in each clamp is folded back on itself such that a plurality of layers of the platform are clamped between the first and/or second clamping surfaces and the peripheral surface of the grip member.

Optionally each clamp is substantially aligned with an attachment location of a respective tensioning device in the direction of said side of the support structure. Optionally each clamp is positioned closer to said side of the support structure that the attachment location of the tensioning device that it is substantially aligned with in the direction of said side of the support structure.

Optionally at least one clamp is not substantially aligned with an attachment location of a respective tensioning device in the direction of said side of the support structure.

Optionally the support straps are arranged to form a grid. The support straps may comprise a first set of support straps that are inclined relative to a second set of said support straps. The first set of support straps may be substantially perpendicular to the second set of support straps.

Optionally each support strap is attached to the platform at at least one support strap attachment section. Optionally each support strap is attached to the platform, towards a side of the platform adjacent the side of the support structure, at a support strap attachment section and the support strap attachment sections are located between the attachment locations at which the tensioning devices are attached to the support straps and the side of the support structure.

The support straps may be positioned above or below the platform. Preferably the support straps are positioned below the platform.

Optionally the platform comprises a plurality of panels.

Optionally each panel has a set of support straps arranged to support the panel and wherein adjacent ends of straps of adjacent panels are connected together so as to transmit tension between the straps of adjacent panels. Adjacent sides of adjacent panels may be connected together. It will be appreciated that the supports straps of the panels together form the support straps of the platform.

Optionally adjacent sides of adjacent panels are each provided with a row of apertures, the adjacent sides being connected together by a cord that is laced through the adjacent rows of apertures or through looped sections of a connecting member received in each aperture. The connecting member may be a strip of material. Optionally a strip of material extends between adjacent sides of panels to cover a gap between them.

Optionally each tensioning device comprises a tension force indicator arranged to indicate the tension in the support strap that is tensioned by the tensioning device. The tension force indicator may be arranged to directly indicate the tension in the support strap or to indicate the tension in the support strap by indicating the tension in a member attached to the support strap. The tension force indicator device may be a tension force indicator device as described in EP20030727118.

Optionally each tensioning device comprises a tensioner and an attachment member that attaches the tensioner to a support strap. Optionally the clamps are positionable independently of the attachment members.

Optionally the attachment members together form an attachment assembly and the clamps together form a clamp assembly and wherein the clamp assembly is positionable independently of the attachment assembly.

Optionally the tensioner is arranged to controllably increase and decrease the tension in the support strap. The tensioner may be a ratchet. The tensioner may be a ratchet tensioner substantially as described in European patent application no. 19910106425. Such a ratchet tensioner is generally referred to as a 'SpanSet ABS' ratchet.

The tensioner may be a hoist, such as a lever hoist or chain hoist.

Optionally the attachment member is arranged to selectively attach to the support strap at a location along the length of the support strap.

Optionally the attachment member is arranged to selectively attach to the support strap at a location along the length of the support strap without having to thread an end of the support strap through the attachment member.

Optionally the attachment member is attachable to a loop in the support strap formed by folding a section of the support strap about itself.

Optionally the attachment member comprises first and second pins that are receivable within first and second loops in a support strap formed by folding a section of the support strap about itself so as to clamp against these loops to attach the attachment member to the strap.

The attachment member may be a clutch. The attachment member may be a buckle.

Alternatively, or additionally, the attachment member may comprise a connector that connects adjacent support straps together. The connector may be a karabiner, or any other suitable type of connector.

Optionally the platform assembly is attached to a support member of the support structure by at least one sling, the at least one sling comprising a loop of material defining first and second looped ends, the at least one sling passing around the support member, with the second looped end passed through the first looped end such that a force applied to the second looped end, in a direction away from the support member, acts to tighten the sling around the support member, wherein the second looped end is folded back on itself as it is passed through the first looped end such that rotation of the sling about the support member varies the distance between the second looped end and the support member.

The sling may directly attach the platform assembly to the support member of the support structure. Alternatively, the sling may indirectly attach the platform assembly to the support member, for example by attaching a said tensioning device or clamp to the support member.

Optionally the support structure is a structure of a building. The support structure may comprise a plurality of support members. Each side of the support structure may be defined by a respective support member.

According to a second aspect of the invention there is provided a method of assembly of a platform assembly and a support structure, the platform assembly comprising a flexible platform and a plurality of support straps arranged to support the platform, the method comprising attaching a plurality of tensioning devices to the support straps at attachment locations and tensioning the support straps with the tensioning devices, supporting a plurality of clamps by the support structure, providing the plurality of clamps along a side of the platform and clamping a side section of the platform, wherein the attachment locations of the tensioning devices are positioned independently of the position of the clamps.

The steps of attaching a plurality of tensioning devices to the support straps at attachment locations, tensioning the support straps with the tensioning devices, supporting a plurality of clamps by the support structure, providing the plurality of clamps along a side of the platform and clamping a side section of the platform, may be performed in any order. However, it is preferable that the plurality of tensioning devices tension the support straps before the plurality of clamps clamp said side section of the platform to the support structure.

Optionally the clamps are attached to the same side of the support structure as the tensioning devices and the clamps are positioned closer to said side of the support structure than the attachment locations of the tensioning devices.

Optionally at least a section of the platform is folded to form a folded section, the folded section forming the side section of the platform that is clamped by the plurality of clamps.

Optionally the folded section defines a peripheral side of the platform and said peripheral side is positioned inboard of the side of the support structure.

Optionally each clamp comprises first and second clamping surfaces and a grip member disposed between the first and second clamping surfaces, wherein the first and second clamping surfaces are moved relative to each other so as to clamp the respective side section of the platform between the first and/or second clamping surfaces and a peripheral surface of the grip member.

Optionally the plurality of clamps form a plurality of sets of clamps, the method comprising supporting each set of clamps by a respective side of the support structure and providing each set of clamps along a respective side of the platform and clamping a respective side section of the platform.

Optionally a plurality of sections of the platform are folded to form respective folded sections, each folded section forming a respective side section of the platform that is clamped by a respective set of clamps.

Optionally the support structure comprises first and second longitudinally extending sides spaced apart in a lateral direction and first and second laterally extending sides spaced apart in the longitudinal direction, the support straps comprising a first set of support straps that extend in the longitudinal direction and are spaced in the lateral direction and a second set of support straps that extend in the lateral direction and are spaced in the longitudinal direction, wherein the method comprises attaching a first section of each strap of the second set of straps to the first longitudinally extending side of the support structure, sequentially attaching, in the direction from the first longitudinally extending side to the second longitudinally extending side of the support structure, each strap of the first set to the first and second laterally extending sides of the support structure, attaching the plurality of tensioning devices to respective second sections of the straps of the second set at said attachment locations, tensioning the second set of straps with the tensioning devices, supporting the clamps along the second longitudinally extending side of the support structure and clamping a side of the platform adjacent the second longitudinally extending side of the support member with said clamps.

Optionally the method comprises tensioning the first set of straps with a plurality of tensioning devices. In this regard, preferably as the first step of straps are sequentially attached, in the direction from the first longitudinally extending side to the second longitudinally extending side of the support structure, once each strap of the first set of straps is attached to the first and second laterally extending sides of the support structure, it is tensioned with a tensioning device, preferably before the attachment of the next strap in the sequence.

Optionally the platform comprises a plurality of panels and the method comprises attaching the plurality of said panels together to form said platform.

Optionally each panel has set of straps arranged to support the panel and wherein adjacent ends of straps of adjacent panels are connected together so as to transmit tension between the straps of adjacent panels.

According to a third aspect of the invention there is provided a clamp comprising:
first and second clamping members, the first and second clamping members having opposed clamping surfaces;
the first and second clamping members being arranged to pivot relative to each other about a pivot axis from a first position to a second position, wherein when the clamping members are in the second position, the opposed clamping surfaces are closer together than when the clamping members are in the first position;
an actuation assembly comprising an actuation member coupled to at least one clamping member such that rotation of the actuation member, about a rotational axis, in a first rotational direction rotates the first and second clamping members relative to each from the first position to the second position;
wherein for a certain rotational position of the actuation member, the actuation member is moveable in a first axial direction relative to at least one clamping member and is coupled to the at least one clamping member such that said relative movement acts to urge the clamping surfaces closer together.

This is advantageous in that if a force is applied to the actuation member in the first axial direction, the actuation member increases the force of the grip of the clamping members by urging the clamping surfaces closer together, thereby providing a secure gripping arrangement.

This is particularly advantageous where the clamp is used to clamp a platform to a support structure, since the load exerted on the platform (e.g. by construction/maintenance) workers on the platform acts to increase the force of the grip of the clamping member on the platform, thereby providing a secure gripping arrangement.

The actuation member may be coupled to the first and/or second clamping members such that rotation of the actuation member in the first rotational direction rotates the first and second clamping members relative to each from the first position to the second position.

For a certain rotational position of the actuation member, the actuation member may be moveable in said first axial direction relative to the first and/or second clamping member and be coupled to said first and/or second clamping member such that said relative movement acts to urge the clamping surfaces closer together.

The first axial direction may have at least a component in the direction of the rotational axis. The first axial direction may be substantially parallel to the rotational axis.

Optionally the actuation member is coupled to the at least one clamping member, such that rotation of the actuation member in a first rotational direction rotates the first and second clamping members relative to each from the first position to the second position, by a coupling member which, as the actuation member is rotated in said first rotational direction, is moved relative to the at least one clamping member such that said relative movement rotates the first and second clamping members relative to each from the first position to the second position. The coupling member may be moved in a direction relative to the at least one clamping member that has at least a component in the first axial direction. The coupling member may be part of the actuation assembly.

Optionally the coupling member is arranged such that as the actuation member moves in the first axial direction, relative to the at least one clamping member, the coupling member is moved relative to the at least one clamping member such that said relative movement acts to rotate the first and second clamping members relative to each other about the pivot axis such that the clamping surfaces are urged closer together. The coupling member may be moved in a direction relative to the at least one clamping member that has at least a component in the first axial direction.

It will be appreciated that when the actuation member, and/or coupling member, moves in the first axial direction relative to said at least one clamping member, the at least one clamping member may be rotating about the pivot axis (and/or the other clamping member may rotate about the pivot axis). In this case, it will be appreciated that the overall relative movement between the at least one clamping member and the actuation member will be in both the axial and rotational directions.

In this regard it will be appreciated that, unless otherwise stated, references to a certain direction, e.g. the 'axial direction' or 'lateral direction' refer generally to that direction, include a direction having at least a component in that direction and do not specifically require that a direction is substantially parallel to that direction.

One of the clamping members may be substantially rotationally fixed about the pivot axis, with the other of the clamping members being pivotable about the pivot axis such that the clamping members are pivotable relative to each other from the first position to the second position. Alternatively, the first and second clamping members may be pivotable about the pivot axis such that the clamping members are pivotable relative to each other from the first position to the second position.

The first and second clamping members may be arranged to pivot relative to each other about the pivot axis from the second position to the first position.

Optionally, the actuation member is provided with a threaded section and the coupling member is provided with a threaded section which is engageable with the threaded section of the actuation member such that rotation of the actuation member in the first rotational direction moves the coupling member relative to the at least one clamping member such that said relative movement rotates the first and second clamping members relative to each from the first position to the second position.

The actuation member and the coupling member may be arranged such that for a certain rotational position of the actuation member, the coupling member is substantially fixed in the first axial direction relative to the actuation member and wherein when the actuation member is moved in said first axial direction, relative to the at least one clamping member, the coupling member moves with the actuation member.

The actuation member may be provided with a stop so as to limit the extent of the axial movement of the actuation member relative to the at least one clamping member. The stop may be a clip mounted on an end section of the actuation member.

The actuation member may be provided with a non-threaded section that is slidably mounted in the first axial direction relative to the at least one clamping member. The non-threaded section may be received within a bore in a support member such that the actuation member is movable in said first axial direction relative to the at least one clamping member.

The bore within the support member may comprise a non-threaded section, or be substantially non-threaded, so as to allow for the relative axial movement of the non-threaded section of the actuation member relative to the support member.

The first and second clamping members may be arranged to pivot relative to each other about the support member. In this respect, the support member may be a shaft about which the first and second clamping members are pivotable. Alternatively, the support member may be any other member that is fixed in the first axial direction relative to the at least one clamping member.

The at least one clamping member may be provided with at least one axially extending slot wherein the coupling member is slidably mounted within the at least one slot for movement in said first axial direction relative to the at least one clamping member. The first and/or second clamping members may be provided with said at least one axially extending slot. Where the first and second clamping members are provided with said at least one axially extending slot, the at least one axially extending slots in the first and second clamping members may at least partially overlap, wherein the coupling member is slidably mounted within said slots for movement in said first axial direction relative to the clamping members.

The first and second clamping members may each comprise a pair of laterally-spaced arms, each arm being provided with a said slot, wherein said slots at least partially overlap and the coupling member is slidably-mounted within said slots for movement in said first axial direction relative to the first and second clamping members.

The arms of the second clamping member may be disposed inwardly and adjacent to the respective arms of the first clamping member, or vice versa. The coupling member may extend in the lateral direction between the arms of the first and second clamping members.

Ends of the coupling member may be received within respective said slots of the first and second clamping members. The coupling member may be laterally retained within the slots by the use of at least one retaining clip provided on at least one of said ends of the coupling member. A said retaining clip may be provided at each opposed end of the coupling member.

The actuation assembly may be provided with a connecting member for connection to a load. The actuation member and/or the coupling member may be provided with said connecting member. The connecting member may comprise an aperture for attachment to a load.

Where each clamping member comprises a said pair of arms, the clamp may comprise a set of first gripping formations that extend laterally between the arms of the first clamping member and/or between the arms of the second clamping member. The set of first gripping formations may be one or more first gripping formations.

Each first gripping formation may be a substantially cylindrical bar. Alternatively, the first gripping formations may have other cross-sectional shapes, including square, or triangular cross-sectional shapes.

The clamping surfaces of the clamping members may be generally arcuate in shape about a lateral axis of the clamp. The clamping surfaces may have a generally convex shape about said lateral axis.

According to a fourth aspect of the invention there is provided a clamp assembly comprising a clamp according to the third aspect of the invention and a grip member, said grip member being for receipt between the opposed clamping surfaces of the first and second clamping members such that a support surface may be clamped between the grip member and the first and/or second clamping surfaces.

The grip member may define a set of second gripping formations that are engageable with the set of first gripping formations of the clamp so as to clamp a support surface between the first and second formations. The set of second gripping formations may be one or more second gripping formations.

Optionally each second gripping formation is a recess and each first formation is a body that is receivable within a respective recess of the second gripping formations. Each first formation may be a recess, wherein each second formation is a body that is receivable within a respective recess of the first gripping formations.

Each recess may be generally arcuate and each body may have a complimentary arcuate shape such that the body is receivable in the recess. Each recess may have a generally concave shape and each body may have a complimentary generally concave shape.

The grip member may be generally elongate, with each second formation extending substantially along the length of the grip member. The grip member may be a substantially solid bar.

According to a fifth aspect of the invention there is provided a support assembly comprising a clamp according to the third aspect of the invention, wherein the clamp is supported by a support structure and a support surface is clamped between the clamping surfaces of the clamp.

The support assembly may comprise at least two said clamps, with each clamp clamping different sections of the support surface between the clamping surfaces of the clamp to provide support to the support surface.

The at least two clamps may be arranged to clamp sections of the support surface on opposite sides of the support surface. The at least two clamps may comprise more than two said clamps, arranged to clamp sections of the support surface distributed about the periphery of the support surface.

The connecting member of each clamp may attach the clamp to the support structure. The connecting member may be attached to an anchor member that is attached to the support structure, such as any of the anchor members described above.

The support surface may be for people to work or walk on.

Each clamp may be part of a clamp assembly according to the fourth aspect of the invention, wherein the respective section of the support surface is clamped between the grip member and the first and/or second clamping surfaces.

The respective section of the support surface may be clamped between the first and second formations of the clamp and grip member respectively.

According to a sixth aspect of the invention there is provided a clamp assembly comprising:
a clamp and a grip member;
said clamp comprising first and second clamping members having opposed clamping surfaces, the first and second clamping members being arranged to pivot relative to each other about a pivot axis between a first position and a second position, wherein when the clamping members are in the second position, the opposed clamping surfaces are closer together than when the clamping members are in the first position;
the first and second clamping members each comprising a pair of laterally-spaced arms, wherein a set of first gripping formations extends laterally between the arms of at least one of the clamping members;
the grip member being receivable between the clamping surfaces of the clamp and defining a set of second gripping formations that are engageable with the set of first gripping formations of the clamp so as to clamp a support surface between the sets of first and second gripping formations.

The sets of first and second gripping formations may be one or more first or second gripping formations respectively.

Each first gripping formation may be a substantially cylindrical bar. Alternatively, the first gripping formations may have other cross-sectional shapes, including square, or triangular cross-sectional shapes.

Optionally each second gripping formation is a recess and each first formation is a body that is receivable within a respective recess of the second gripping formations. Each first formation may be a recess, wherein each second formation is a body that is receivable within a respective recess of the first gripping formations.

Each recess may be generally arcuate and each body may have a complimentary arcuate shape such that the body is receivable in the recess. Each recess may have a generally concave shape and each body may have a complimentary generally concave shape.

The grip member may be generally elongate, with each second formation extending substantially along the length of the grip member. The grip member may be a substantially solid bar.

The grip member may have any of the features of the grip member described above in relation to the clamp assembly of the second aspect of the invention.

According to a seventh aspect of the invention there is provided a support assembly comprising a clamp assembly according to the sixth aspect of the invention and a support surface clamped between the clamping surfaces of the first and second clamping members and the grip member.

The support assembly may comprise at least two said clamp assemblies, with each clamp of each clamp assembly clamping different sections of the support surface between the first and/or second clamping surfaces of the clamp and the grip member to provide support and tension to the support surface.

The at least two clamp assemblies may be arranged to clamp sections of the support surface on opposite sides of the support surface. The at least two clamp assemblies may comprise more than two said clamp assemblies, arranged to clamp sections of the support surface distributed about the periphery of the support surface.

Each clamp of each clamp assembly may be attached to an attachment point by its connecting member. The attachment point may be any suitable point on a structure, for example on a structure of a building.

Any of the features of any of the above aspects of the invention may be combined with any other feature of any of the other aspects of the invention, in any combination.

Specific embodiments of the present invention will now be described, by way of example only, with reference to the accompanying drawings, in which.

Figure 22:
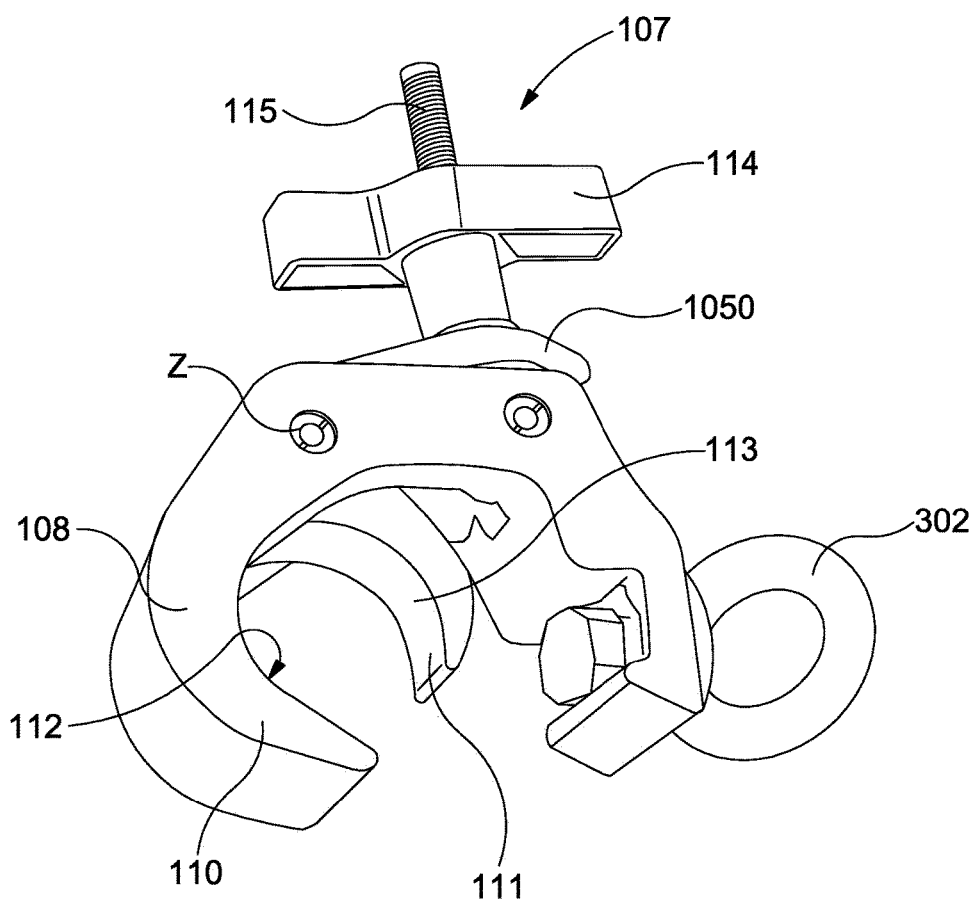
Figure 23:
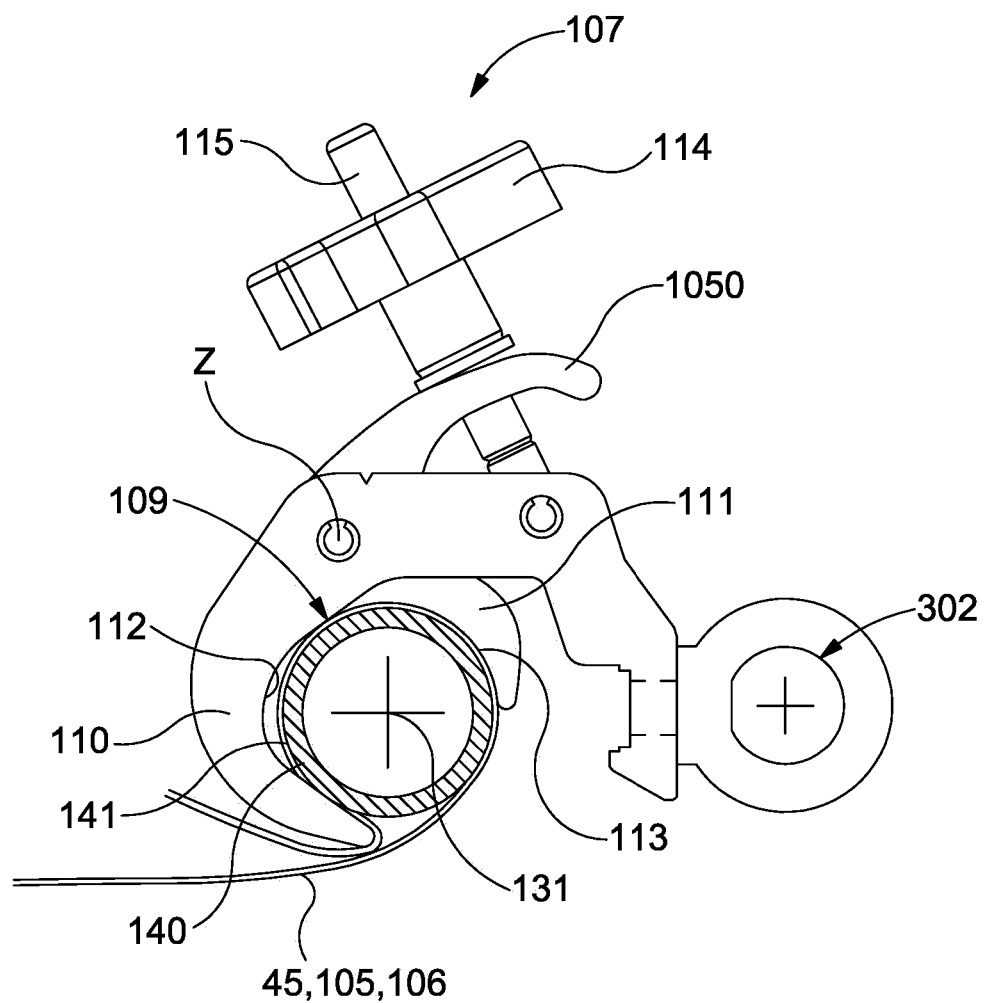
Figure 24:
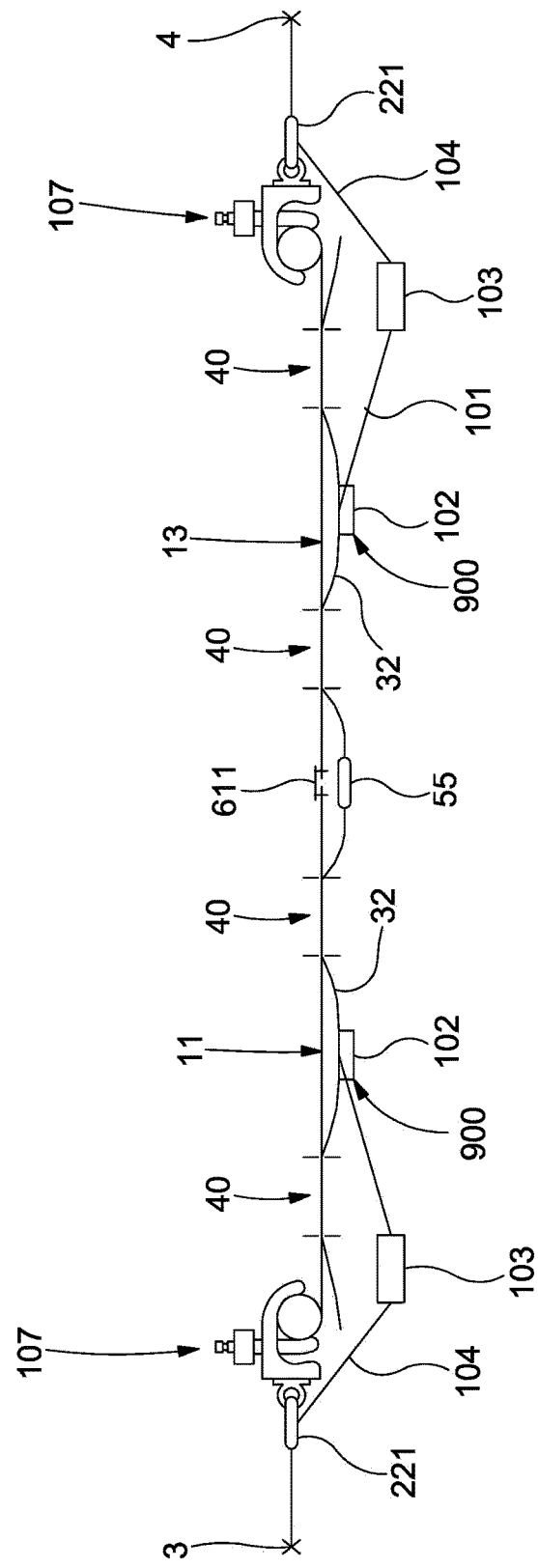
Figure 25:
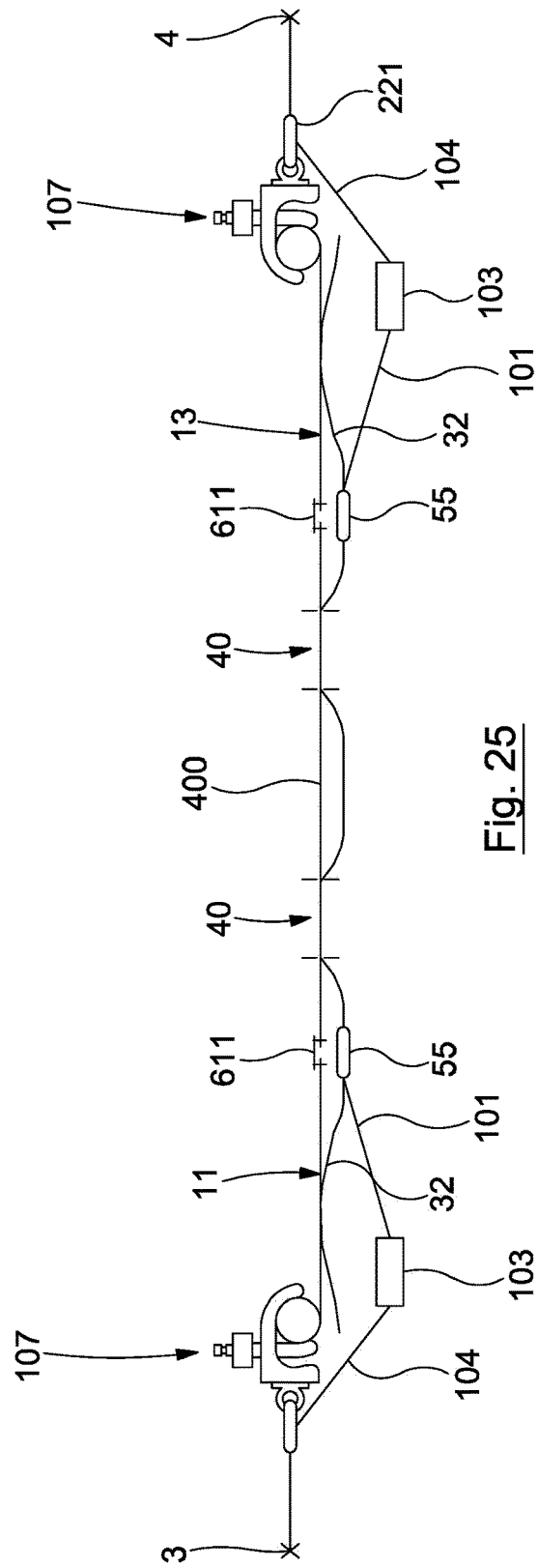
Figure 26:
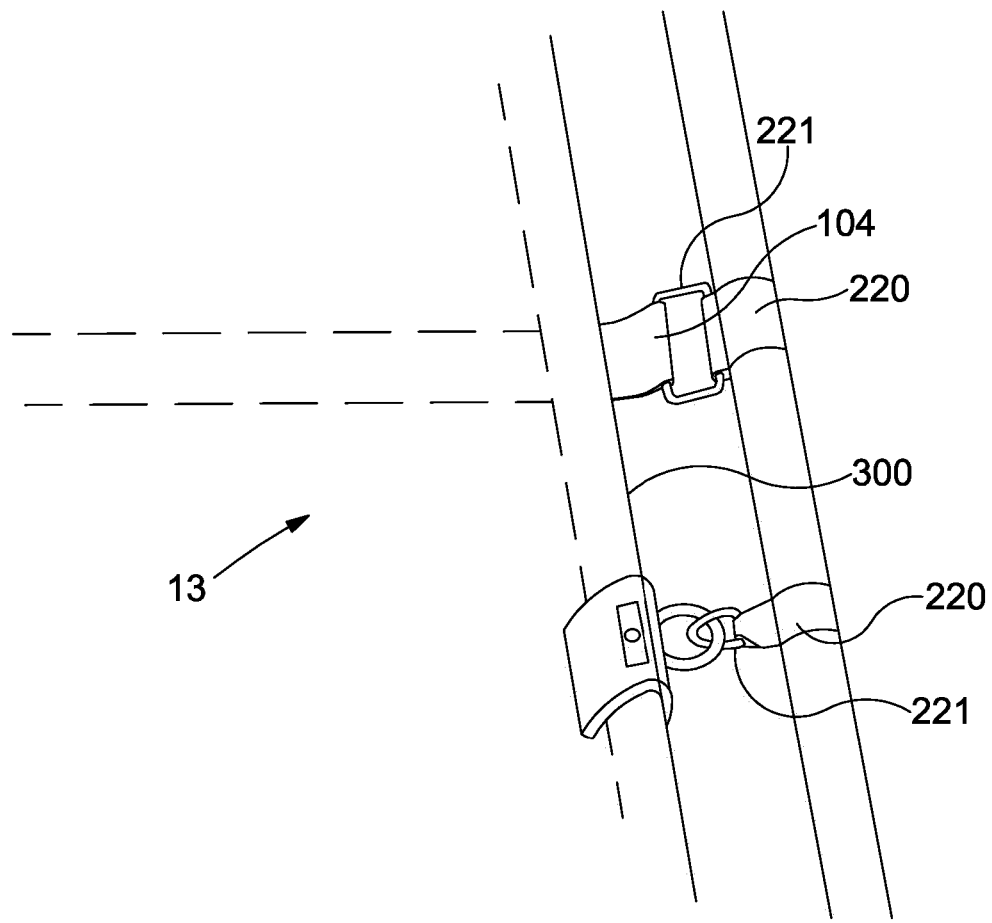
Figure 27:
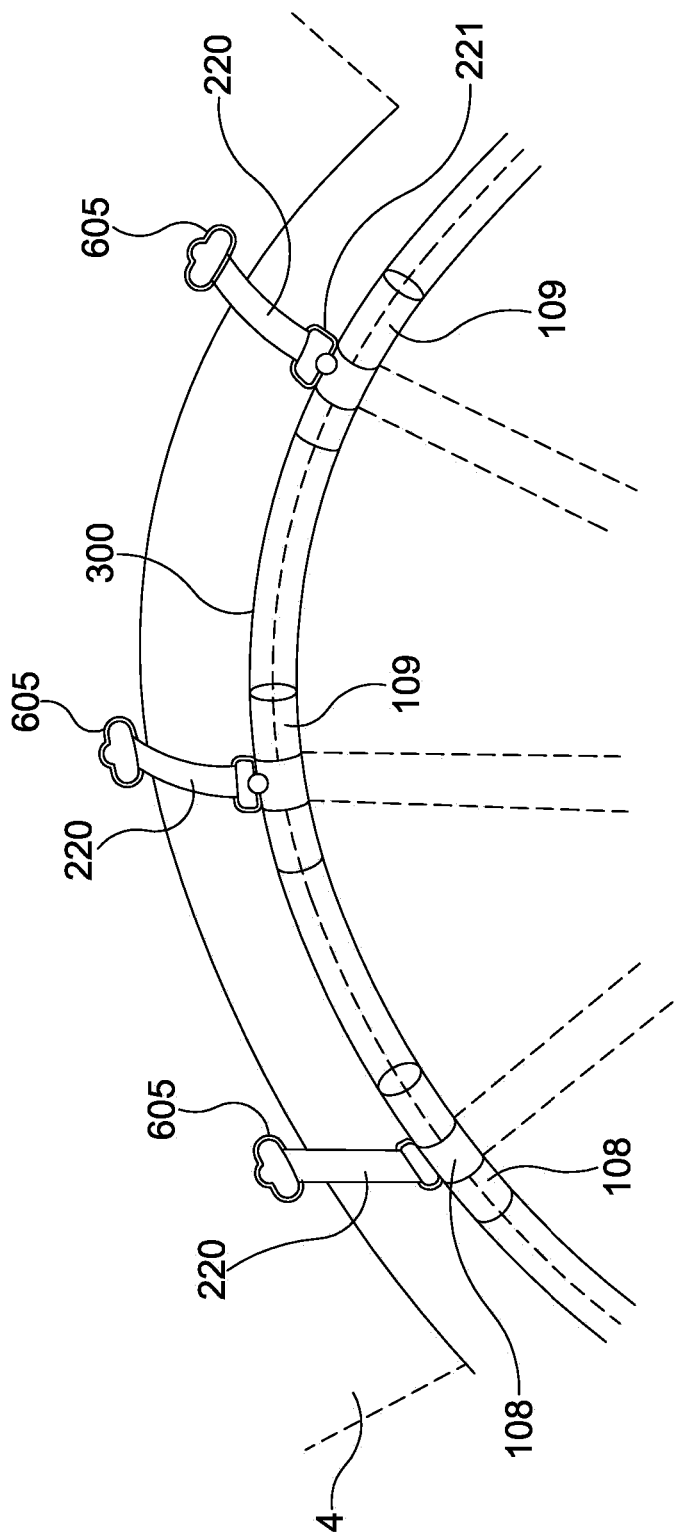
Figure 28C:
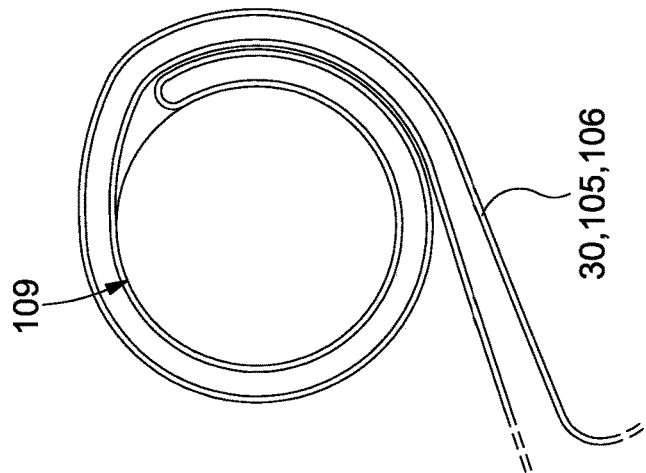
Figure 28B:
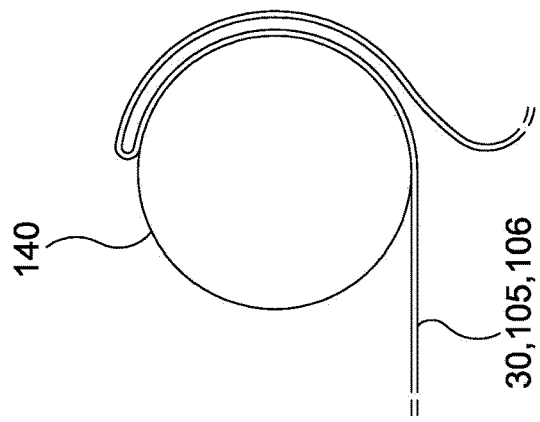
Figure 28A:
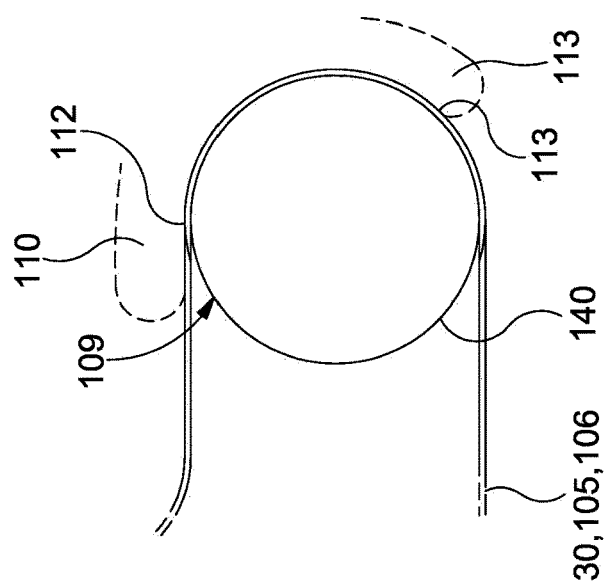
Figure 30:
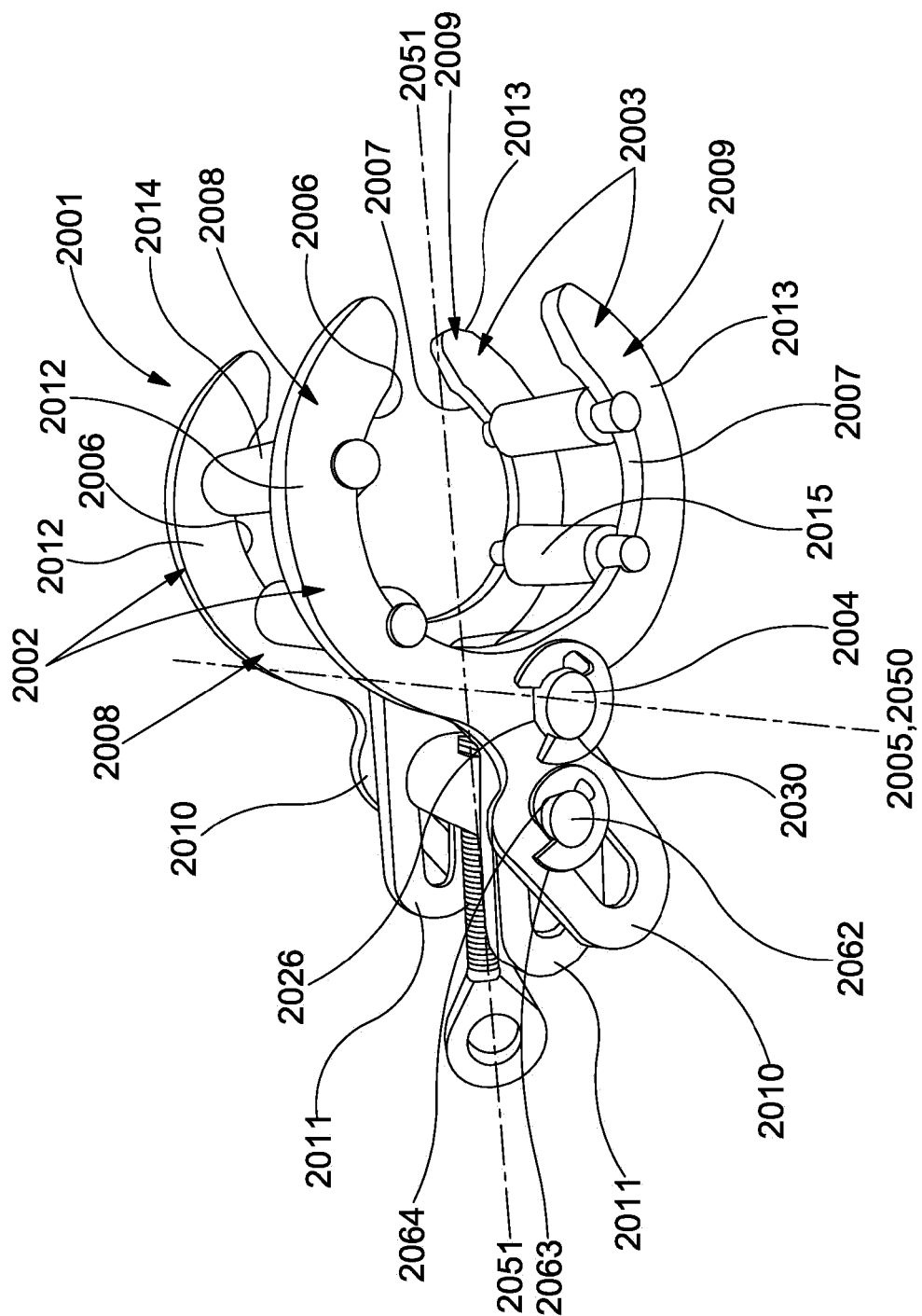
Figure 31:
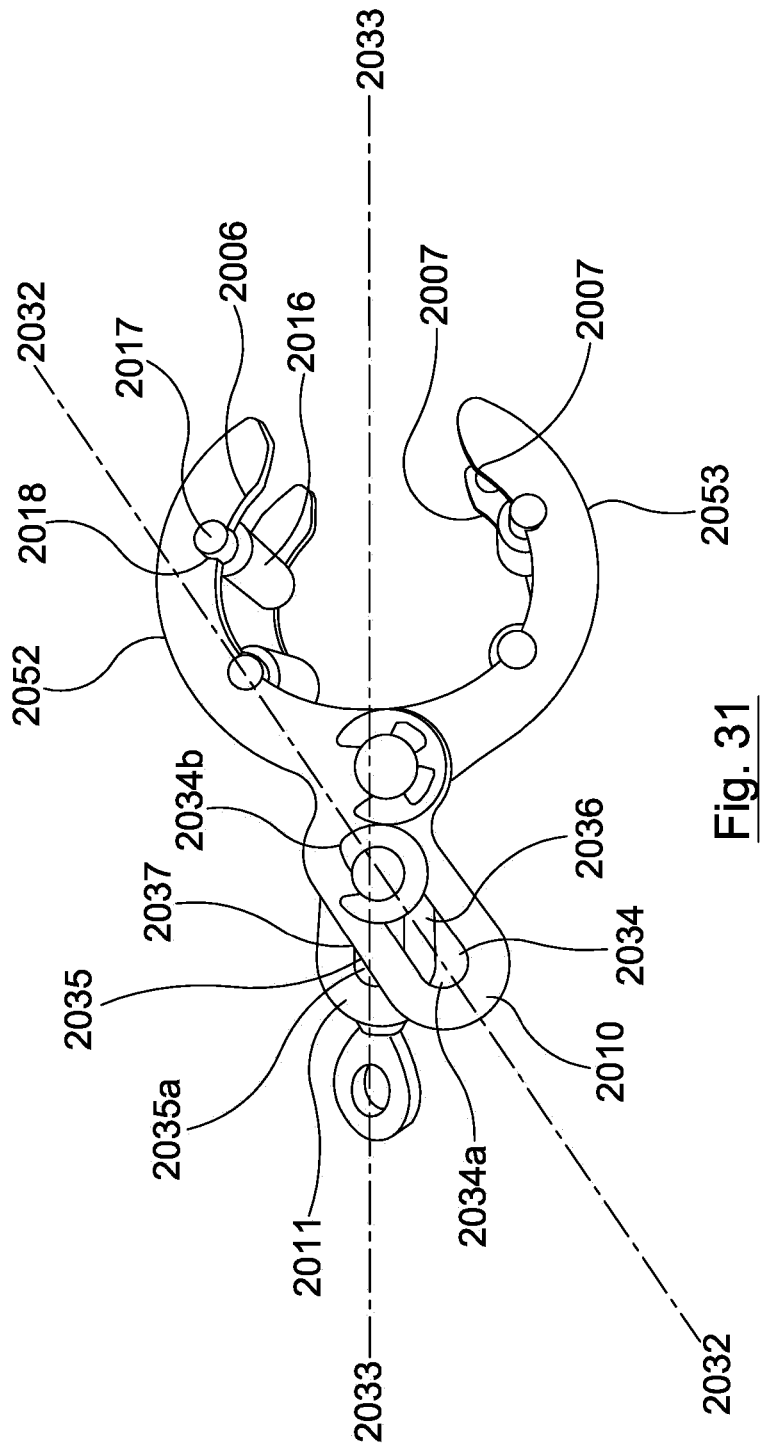
Figure 32:
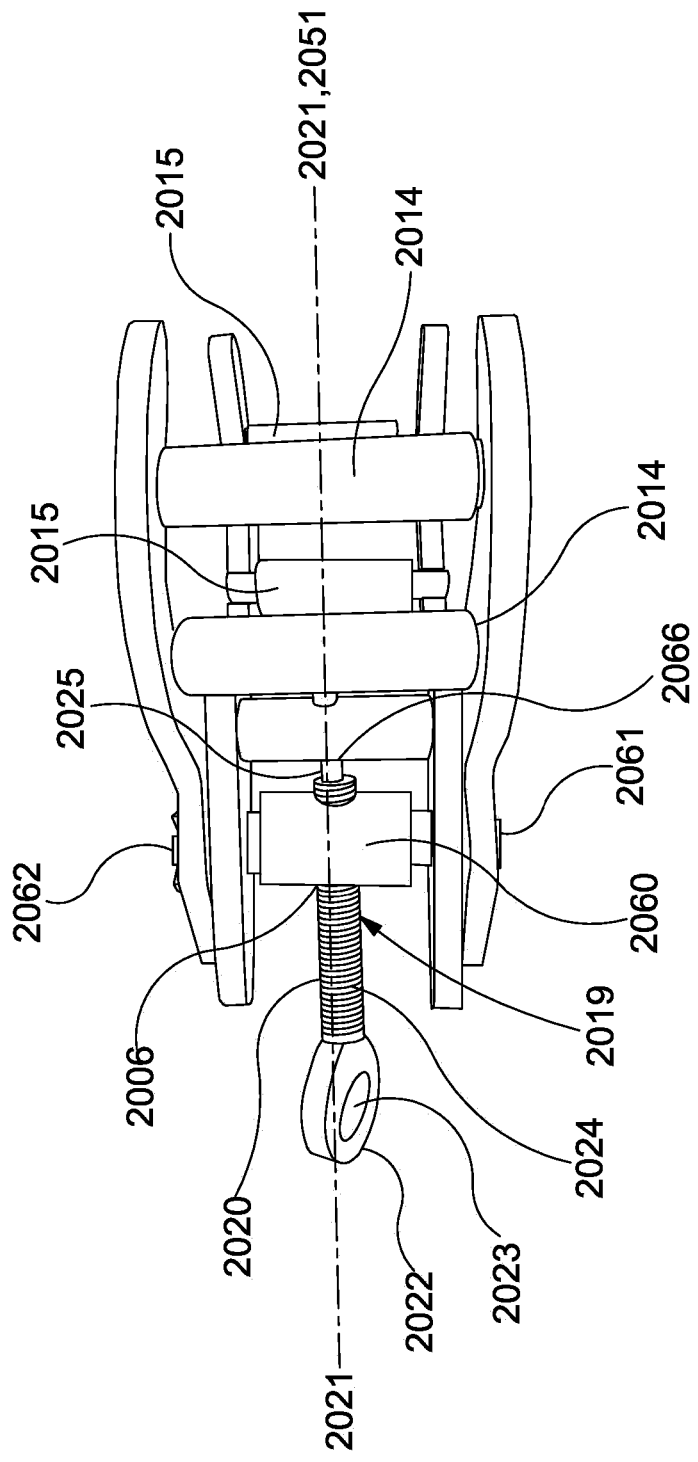
Figure 33:
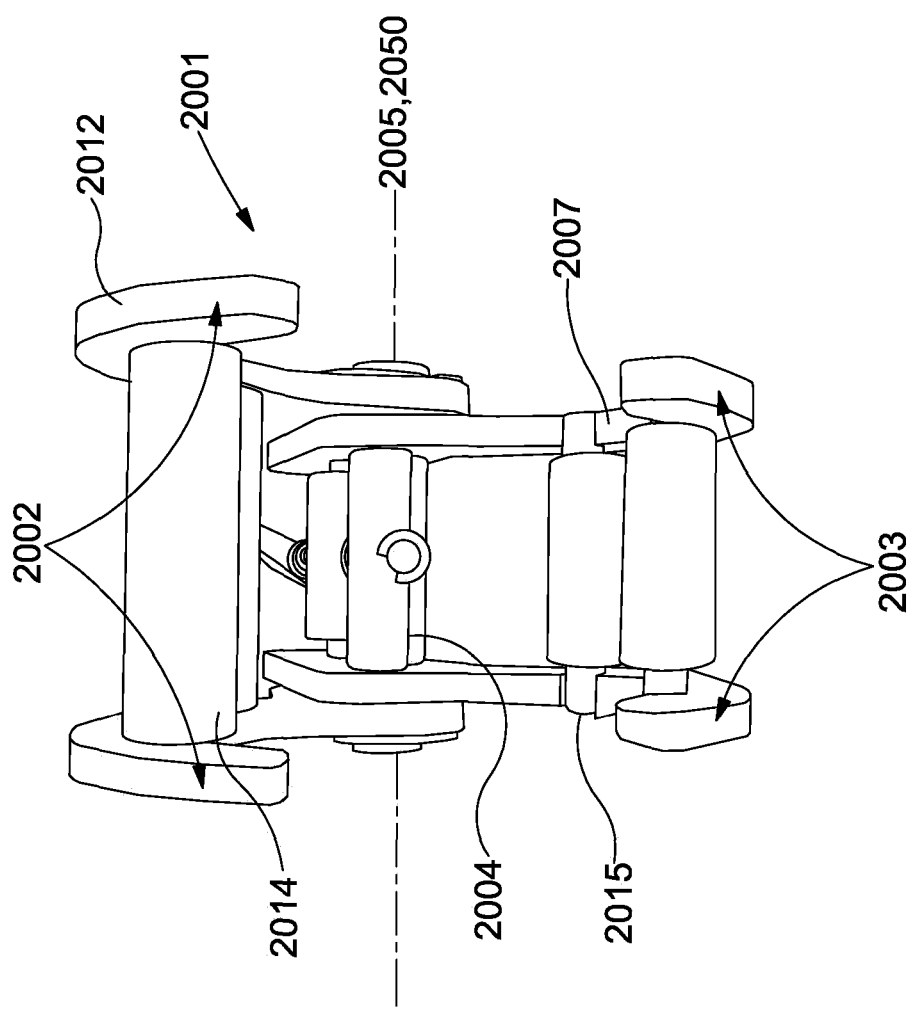
Figure 34:
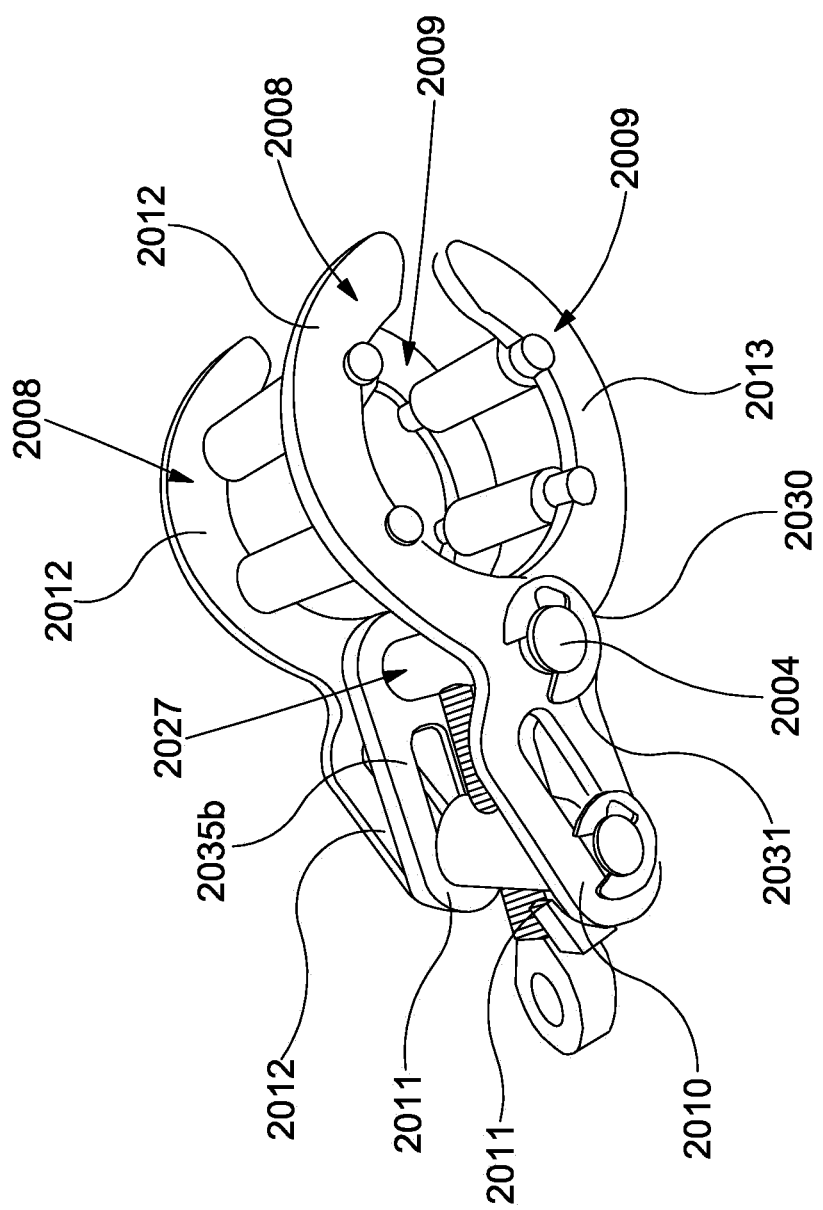
Figure 35:
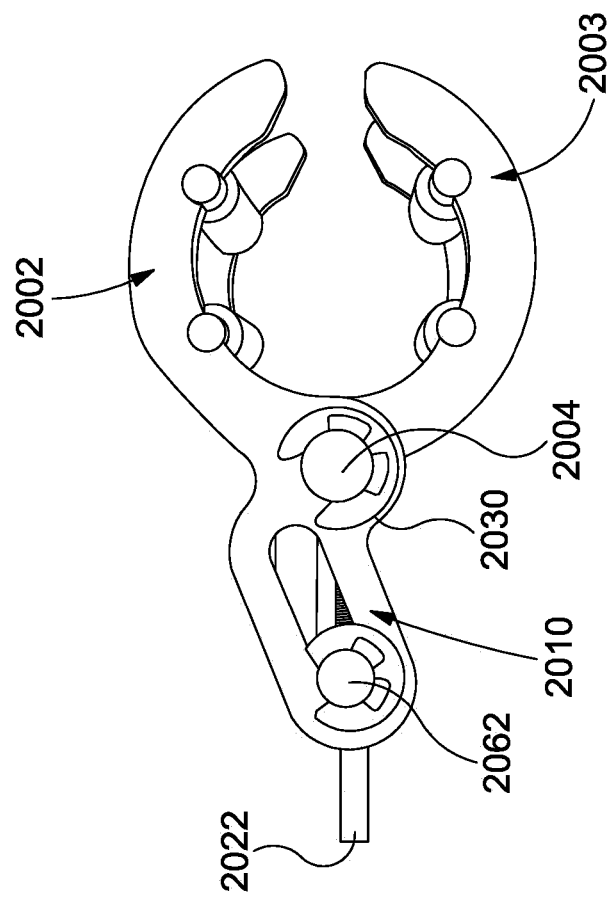
Figure 36:
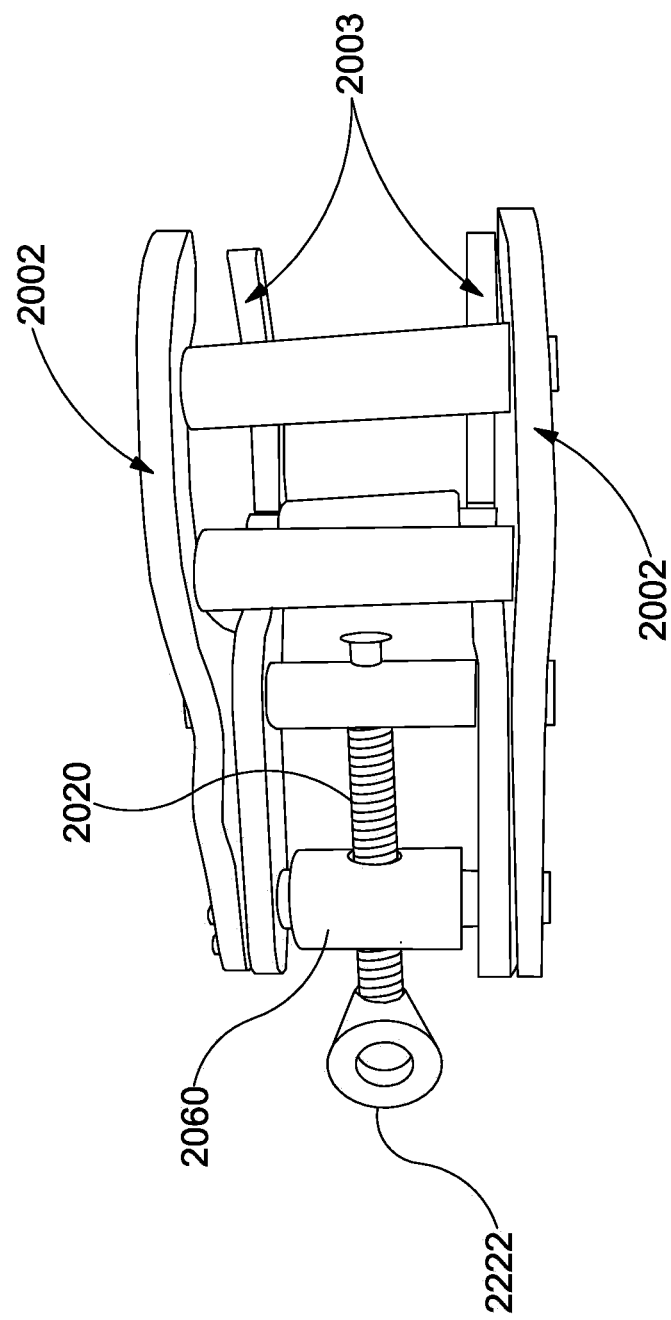
Figure 37:
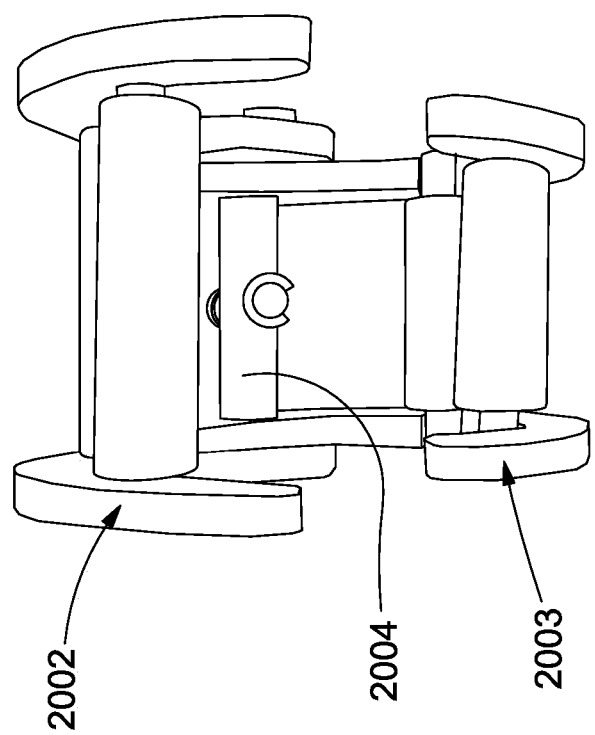
Figure 38:
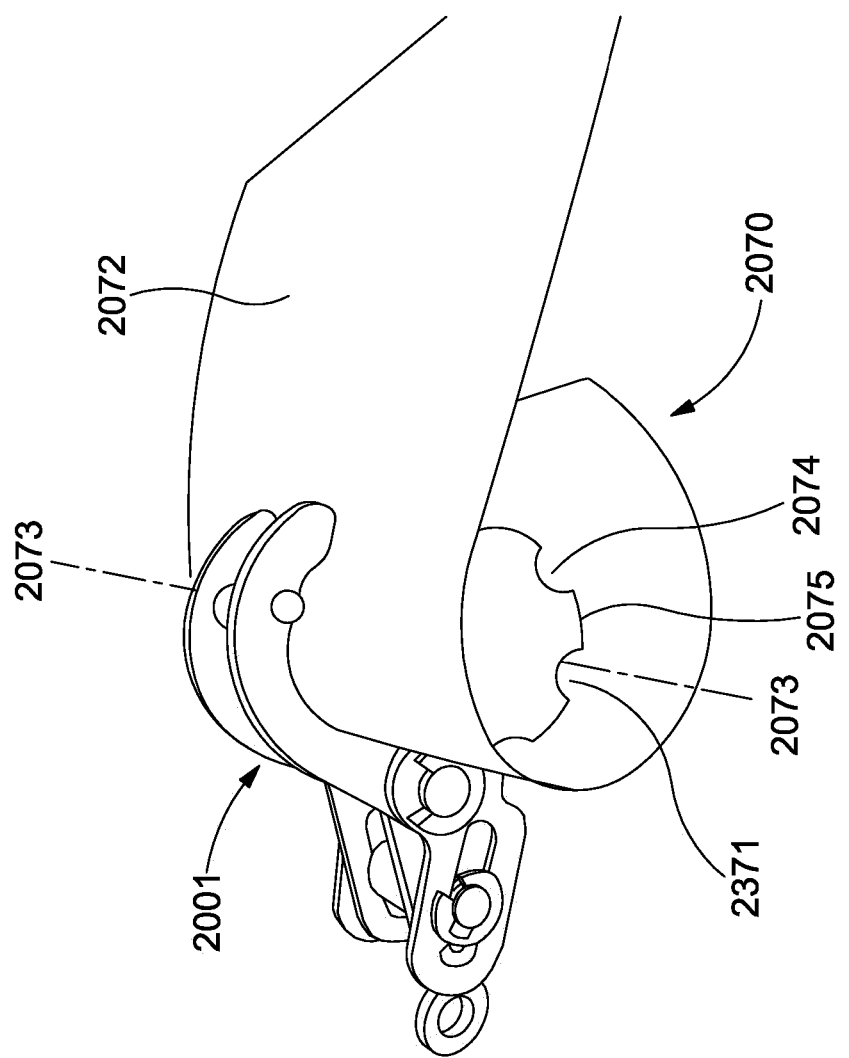

FIGS. 18 to 21 each show a perspective view of a ratchet tensioner of the platform assembly and together sequentially show the method of use of the ratchet tensioner to apply tension to a support strap of the platform assembly;

FIG. 22 shows a perspective view of a clamp assembly of the platform assembly of FIGS. 1 to 12;

FIG. 23 shows a side elevational view of the clamp assembly shown in FIG. 22, with a section of a platform of the platform assembly clamped by the clamp assembly;

FIG. 24 shows a schematic side view of a platform assembly according to a second embodiment the present invention, installed on a building structure;

FIG. 25 shows a schematic side view of a platform assembly according to a third embodiment of the present invention, installed on a building structure;

FIG. 26 shows a perspective view of a portion of an upper surface of a platform assembly according to a fourth embodiment of the present invention, installed on a building structure;

FIG. 27 shows a perspective view of a portion of an upper surface of a platform assembly according to a fifth embodiment of the present invention, installed on a building structure;

FIGS. 28A to 28C show different ways in which a section of the platform of the platform assembly of any of the embodiments of the platform assembly shown in FIGS. 1 to 27, may be curved around an arcuate surface of a grip member of a clamp assembly;

FIGS. 29A to 29C show different configurations of a sling that may be used as an anchor to the support structure;

FIG. 30 is a perspective view of a clamp according to the third aspect of the invention, where its clamping members are in a first position;

FIG. 31 shows a side elevational view of the clamp of FIG. 30;

FIG. 32 shows a plan elevational view of the clamp shown in FIG. 30;

FIG. 33 shows a front elevational view of the clamp shown in FIG. 30;

FIG. 34 shows the clamp of FIG. 30, but where its clamping members are in a second position;

FIG. 35 shows a side elevational view of the clamp shown in FIG. 34;

FIG. 36 shows a plan elevational view of the clamp shown in FIG. 34;

FIG. 37 shows a front elevational view of the clamp shown in FIG. 34;

FIG. 38 shows a perspective view of a support assembly according to an aspect of the invention;

FIG. 39 shows a perspective view of a grip member of a clamp assembly according to an aspect of the invention.

FIG. 40 shows a front elevational view of the grip member shown in FIG. 39, and

Figure 41:
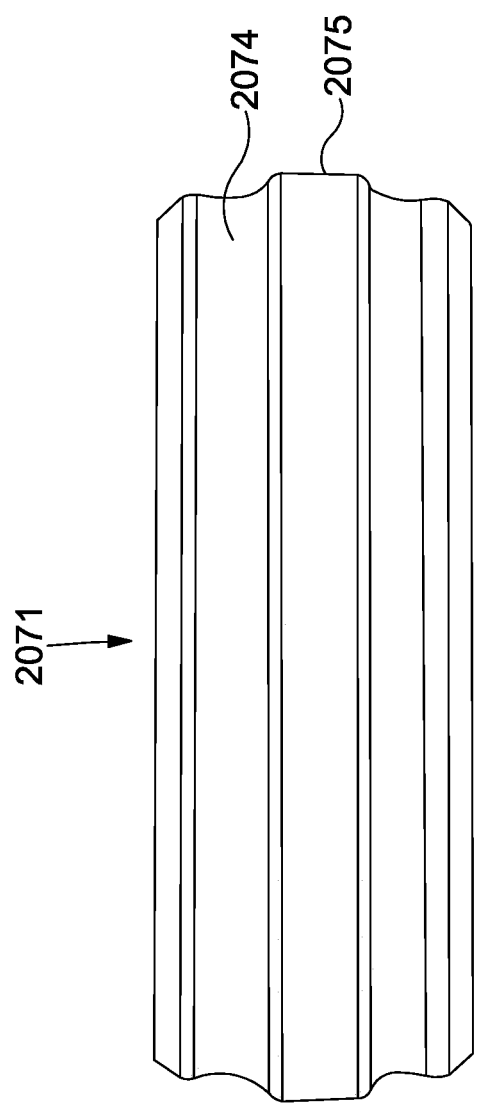

FIG. 41 shows a perspective view of the grip member shown in FIG. 39.

Figure 1:
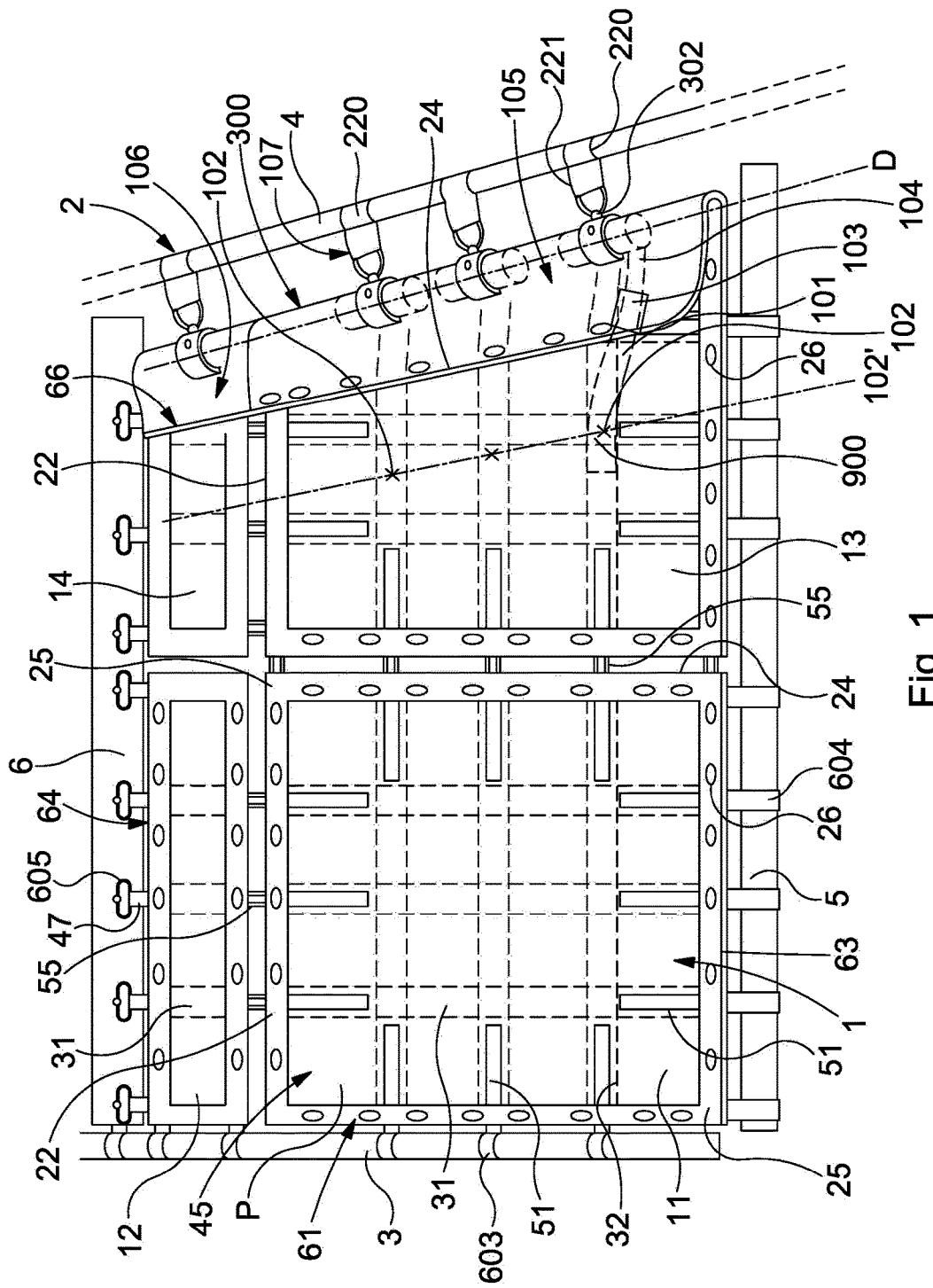
FIG. 1 shows an upper perspective view of a first embodiment of a platform assembly according to the present invention installed on a building structure, with infill strips of the platform assembly omitted for illustrative purposes.

Referring to FIG. 1 there is shown a perspective view of a first embodiment of a platform assembly 1 according to the present invention installed on a building structure 2.

The platform assembly 1 extends across a space defined by the building structure 2.

The building structure 2 comprises a first pair of opposed first and second support members 3, 4. The first support member 3 extends, from a first end to a second end, along a longitudinal axis that defines a longitudinal direction. The second support member 4 is spaced from the first support member 3 in a lateral direction (the lateral direction being substantially perpendicular to the longitudinal direction). The second support member 4 extends, from a first end to a second end, along a longitudinal axis that is inclined towards the longitudinal axis of the first support member 3. The first and second support members 3, 4 are substantially horizontal and are substantially aligned with each other in the horizontal direction.

It will be appreciated that, unless otherwise stated, references to a member (or any other type of body) extending in the longitudinal, or lateral, direction refer to where that member extends in a direction that has at least a component in the longitudinal, or lateral, direction respectively and does not require that that member extends in a direction that is substantially parallel to the longitudinal, or lateral, direction respectively. Accordingly, the first and second support members 3, 4 will be referred to as extending in the longitudinal direction (even though the second support member 3 is inclined relative to the longitudinal direction).

The building structure 2 also comprises a second pair of opposed first and second support members 5, 6. The first support member 5 (of the second pair) extends generally between the respective first ends of the first and second support members 3, 4 of the first pair and extends along a longitudinal axis that is substantially parallel to the lateral direction. The second support member 6 is spaced from the first support member 5 in the longitudinal direction and extends generally between the respective second ends of the first and second support members 3, 4 of the first pair. The second support member 6 extends along a longitudinal axis that is substantially parallel to the lateral direction.

The first and second support members 5, 6 of the second pair are substantially horizontal and are substantially aligned in the vertical direction with the first and second support members 3, 4 of the first pair. Accordingly, the first and second pairs of support members 3 to 6 define a horizontal plane P.

Each support member 2, 3 of the first pair, is a substantially cylindrical steel frame member of the building structure 2.

Each support member 5, 6 of the second pair is an I-beam of the building structure 2.

However, it will be appreciated that the platform assembly 1 is for use with a variety of building structures with different types and configurations of support members 3 to 6. One or more of the support members may be any suitable load bearing structure of a building, for example a beam (e.g. with a square, rectangular, C shaped or other cross-sectional shape) a solid block of material (for example of concrete or wood), a girder, a frame member etc.

Furthermore, the support members 3 to 6 may be at any inclination relative to each other, and may or may not be aligned in the horizontal or vertical directions, as long as they define a space between them across which the platform assembly 1 may be supported by the support members. There may be fewer or more support members, for example there may be at least two opposed support members that define a space between them that the platform assembly extends across. As another example, there may be three support members that are inclined relative to each other to define a triangular shaped space that the platform assembly extends across. It will be appreciated that there may be any number, type and configuration of support members that define one or more spaces that the platform assembly extends across.

The platform assembly 1 comprises a flexible platform 45 and a plurality of support straps 31, 32 arranged to support the platform 45.

In the described embodiment the platform 45 comprises a grid of four mesh panels arranged in a 2×2 arrangement, a first longitudinal row of mesh panels 11, 12 and a second longitudinal row of mesh panels 13, 14. However, it will be appreciated that the platform assembly 1 may comprise any number of one or more of mesh panels in any arrangement of rows and/or columns so as to form a platform that extends between the support members 3 to 6.

In the described embodiment the first row of mesh panels 11, 12 are substantially aligned in the lateral direction and are adjacent to each other in the longitudinal direction.

The second pair of mesh panels 13, 14 are substantially aligned in the lateral direction and are adjacent to each other in the longitudinal direction.

The first row of mesh panels 11, 12 is laterally adjacent to the second row of mesh panels 13, 14. The mesh panels 11 to 14 are supported by support straps 31, 32, that are connected to the support members 3 to 6 of the building structure 2, so as to form a load-bearing platform 45 between the support members 3 to 6, for supporting construction/maintenance workers and their equipment, as described below.

In the currently described embodiment the first and second pairs of support members 3 to 6 are substantially aligned in the vertical direction and define a horizontal plane P. In this case, the platform 45 is substantially horizontal.

However, one or more opposed support members 3 to 6 may be offset from each other in the vertical direction such that the platform 45 extending between them is inclined relative to a horizontal plane. In this case, workers on the platform 45 may have personal protection equipment such as harnesses attached to the building structure to prevent them falling down the sloped platform 45.

Each mesh panel 11 to 14 is substantially identical. It will be appreciated that the length of the first and second support members 3, 4, of the first pair (and the respective mesh panels 12, 14) has been shown as truncated in FIG. 1 (see the dotted line portions) for illustrative purposes.

FIGS. 2 to 5 show one of the mesh panels 11 to 14.

Figure 2:
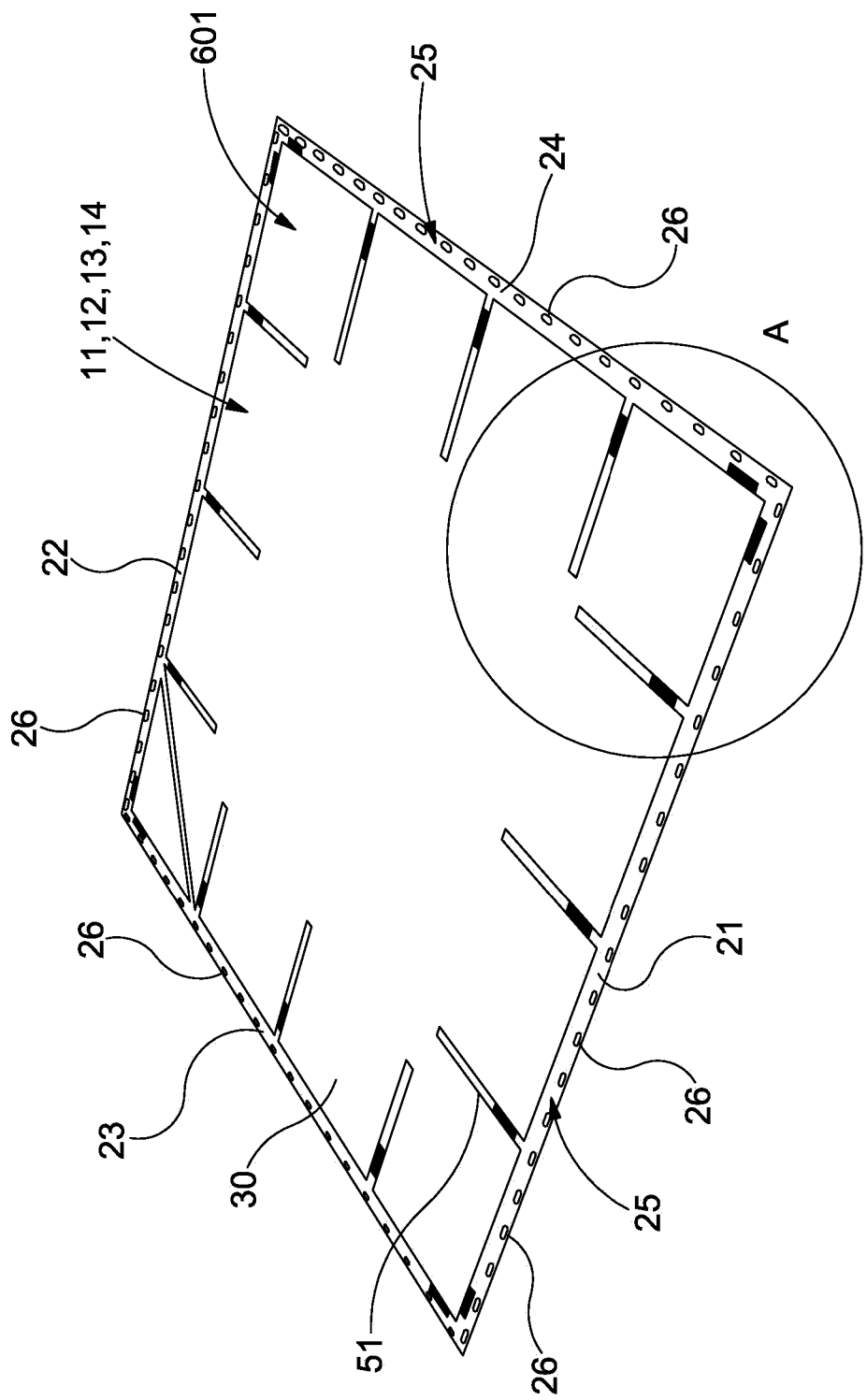
FIG. 2 shows a perspective view of an upper surface of a mesh panel of the platform assembly shown in FIG. 1.
Figure 3:
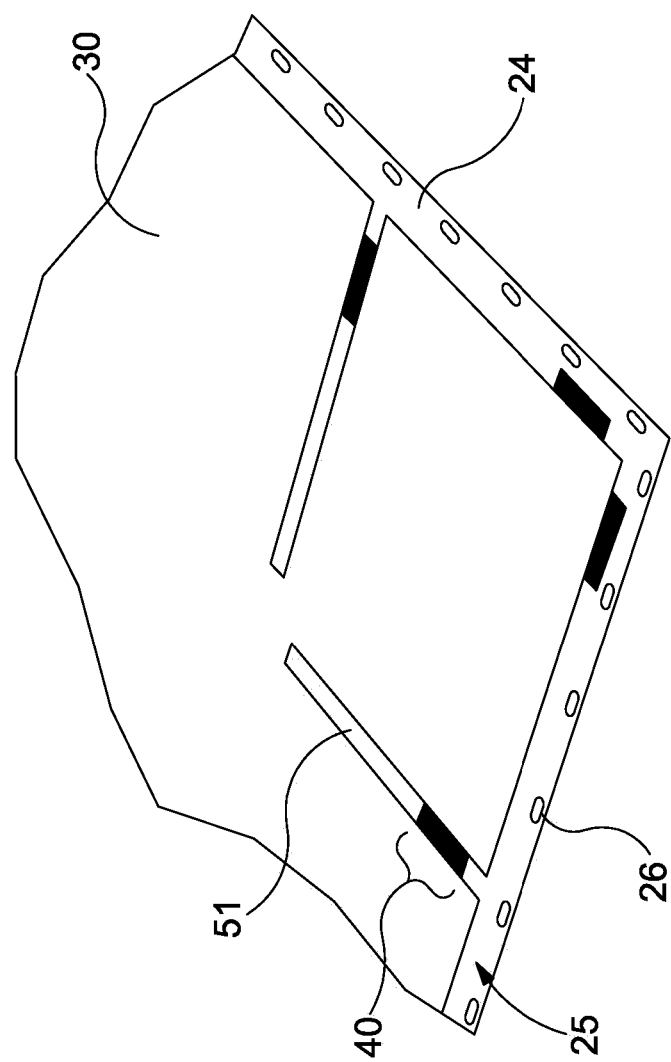
FIG. 3 shows an enlarged view of the area labelled A in FIG. 2.

Referring to FIGS. 2 to 3, there is shown an upper surface of each mesh panel 11 to 14. Each mesh panel 11 to 14 comprises a substantially square panel of a flexible durable membrane 30 in the form of a lattice of woven polyester fibres coated in polyvinyl chloride (PVC). The membrane 30 is perforated (not shown), through its thickness, so that it is permeable to air, thereby reducing wind loading on the platform assembly.

Each mesh panel 11 to 14 has first and second opposed laterally extending sides 21, 22 that are spaced in a longitudinal direction and first and second opposed longitudinally extending sides 23, 24 that are spaced in the lateral direction (longitudinal and lateral directions relative to the panel). Each side 21 to 24 of the mesh panel is of substantially the same length and each laterally extending side 21, 22 is substantially perpendicular to each longitudinal extending side 23, 24 such that the mesh panel forms a square shape (in plan form).

The upper surface 601 of each mesh panel is provided with an attachment strip 25 that is attached to the upper surface 601 and extends around the periphery of the durable membrane 30. The attachment strip 25 is provided with a plurality of apertures 26 distributed along the length of the attachment strip 25, along each side of the mesh panel 11 to 14. The attachment strip 25 is for attachment to an infill strip (see below).

The upper surface 601 of each mesh panel is provided with a plurality of reinforcements strips 51 that are attached to the upper surface and extend inboard, from each respective side of the panel, along the upper surface of the durable membrane 30, in a direction substantially perpendicular to that side of the panel. In this respect, each side of the mesh panel is provided, on its upper surface 601, with three reinforcements strips 51 distributed in the direction of that side of the mesh panel. Each reinforcement strip 51 extends inwardly along the panel a relatively short distance such that it terminates before it reaches an adjacent reinforcement strip 51 of an adjacent side of the mesh panel.

Figure 4:
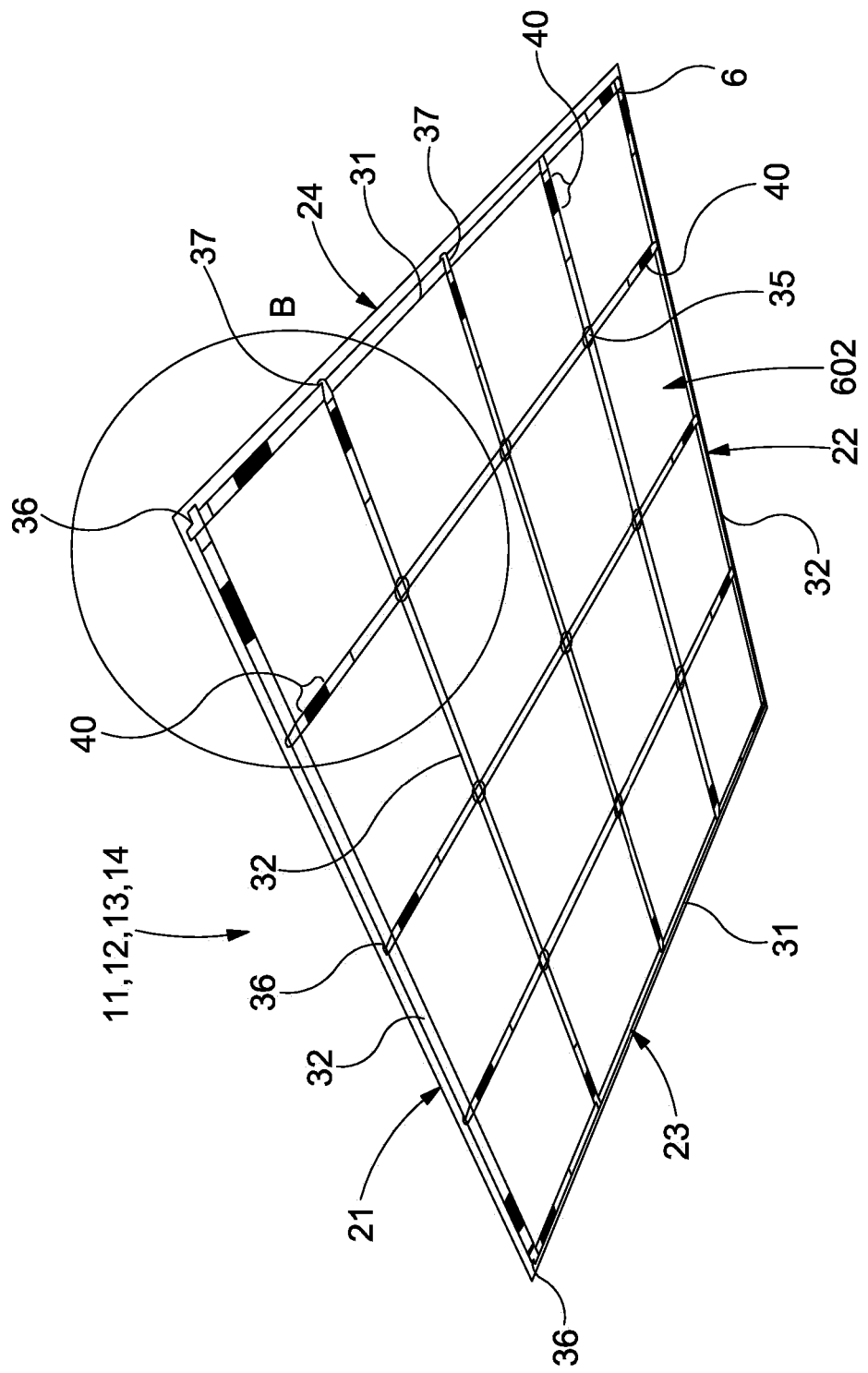
FIG. 4 shows a perspective view of a lower surface of the mesh panel shown in FIG. 2.
Figure 5:
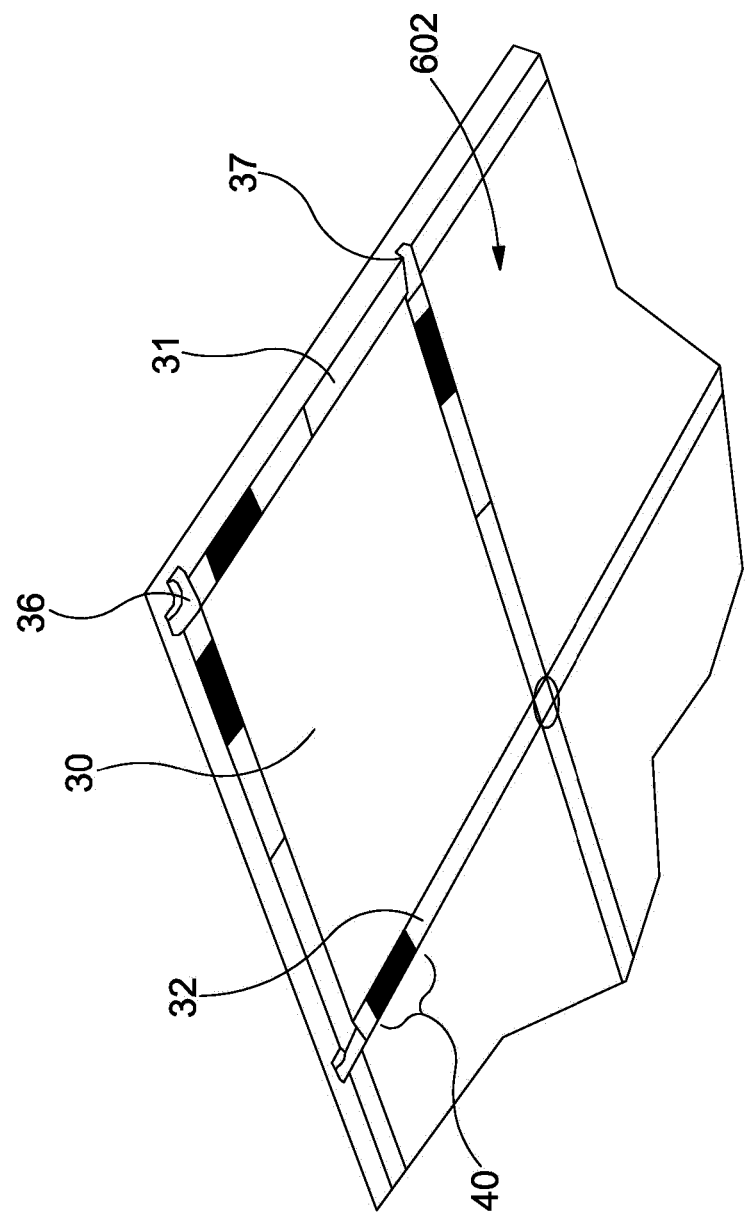
FIG. 5 shows an enlarged view of the area labelled B in FIG. 4.

Referring to FIGS. 4 and 5 there is shown a lower surface of each mesh panel 11 to 14. The lower surface 602 of each mesh panel is provided with a plurality of longitudinally extending support straps 31 that are distributed in the lateral direction. In the described embodiment each mesh panel 11 to 14 comprises five of said longitudinally extending support straps 31 spaced substantially the same distance apart in the lateral direction.

Each mesh panel is also provided with a plurality of laterally extending support straps 32 that are distributed in the longitudinal direction of the panel. In the described embodiment each mesh panel comprises five of said laterally extending support straps 32 spaced substantially the same distance apart in the longitudinal direction.

The longitudinally extending support straps 31 and the laterally extending support straps 32 substantially perpendicular to each other and extend in the plane of the mesh panel 11 to 14.

However, it will be appreciated that one or more of the mesh panels 11 to 14 may have a different number and/or spacing and/or orientation of said longitudinally and laterally extending straps 31, 32 and may have a different overall size or dimension.

Each longitudinally extending support strap 31 extends from a first end to a second end, with each of the first and second ends terminating inboard of, but proximal to, a respective laterally extending side 21, 22 of the mesh panel. Similarly, each laterally extending support strap 32 extends from a first end to a second end, with each of the first and second ends terminating inboard of, but proximal to, a respective longitudinally extending side 23, 24 of the mesh panel.

The longitudinally extending support straps 31 and the laterally extending support straps 32 together form a grid structure that underlies the durable membrane 30 and supports said membrane 30. The support straps 31, 32 are attached to the lower surface 602 of the mesh panel as described below.

At each point of intersection between the longitudinally and laterally extending support straps 31, 32, the intersecting support straps 31, 32 are connected to each other by a circular connecting ring 35 that is slidably mounted on the respective straps 31, 32. The connecting rings 35 retain the longitudinally and laterally extending support straps 31, 32 together, in a direction out of the plane of the mesh panel, but allow for relative movement of the longitudinally and laterally extending straps, in the longitudinal and lateral directions.

The first and second ends of each longitudinally extending strap 31 are each looped to form an eyelet 36. The eyelets 36 of the longitudinally extending straps 31 on the same side of the mesh panel are substantially aligned in the longitudinal direction. First and second of the laterally extending support straps 32 are provided adjacent to, and extend along, the first and second laterally extending side 21, 22 of the panel respectively and passes through the aligned eyelets 36 in the longitudinally extending straps 31 on that side of the panel.

Similarly, the first and second ends of each laterally extending strap 32 are each looped to form an eyelet 37. The eyelets 37 of the laterally extending straps 32 on the same side of the mesh panel are substantially aligned in the lateral direction. First and second of the longitudinally extending support straps 31 are provided adjacent to and extend along the first and second longitudinally extending sides of the panel 23, 24 respectively and pass through the aligned eyelets 37 in the laterally extending straps 32.

Each of the support straps 31, 32 is attached to the lower surface 602 of the overlying membrane 30 along first and second support strap attachment sections 40 of its length provided towards respective first and second ends of the strap 31, 32, inboard of the respective end. The section of the support straps 31, 32, provided between said sections 40, is not attached to the overlying membrane 30. In the currently described embodiment, said sections 40 of the support straps 31, 32 are attached to the overlying membrane 35 by being stitched to the overlying membrane 30.

In this regard, each reinforcement strip 51 on the upper surface of the panel overlies a respective section 40 of a support strap 31, 32 and provides a reinforced surface through which the section 40 of the support strap 31, 32 is stitched to the membrane 30.

The stitching passes through each respective section 40 of the support straps 31, 32 into the respective overlying reinforcement strip 51

Referring back to FIG. 1, for each of the first and second mesh panels 11, 12 of the first row, the first ends of each of the laterally extending support straps 32, at the first longitudinally extending sides 23 of each mesh panel (which together form a first longitudinally extending side 61 of the platform 45) are fixedly attached to the first support member 3 of the first pair by a coupling member in the form of a karabiner (not shown) that is received within the respective eyelet 37 at that end and is connected to an anchor member in the form of a sling 603 that is looped around the first longitudinally extending support member 3.

The first laterally extending sides 21 of each mesh panel 11, 13 of the first and second rows together form a first laterally extending side 63 of the platform 45.

For each of these mesh panels 11, 13, a first end of each of the longitudinally extending support straps 31, at the first laterally extending sides 21 of each mesh panel 11, 13, apart from the support strap 31 at the second longitudinally extending sides 24 of the mesh panels 11, 13 (see below), is fixedly attached to the first laterally extending support member 5 of the second pair by a coupling member in the form of a karabiner (not shown) that is received within the respective eyelet 36 at that end and is connected to an anchor member in the form of sling (604 that is looped around the first laterally extending support member 5 of the second pair).

The second laterally extending sides 22 of each second mesh panel 12, 14 of the first and second rows together form a second laterally extending side 64 of the platform 45.

For each of these mesh panels 12, 14, a second end of each of the longitudinally extending support straps 31 (at the second laterally extending sides 22 of each mesh panel 12, 14), apart from the support strap 31 at the second longitudinally extending sides 24 of the mesh panels 12, 14 (see below), is fixedly attached to the second laterally extending support member 6 of the second pair by a coupling member in the form of a karabiner (not shown) that is received within the respective eyelet 36 at that end and that is connected to an anchor member in the form of a sling 47 that is looped around an eyelet of an eye bolt 605 that is screwed into the second laterally extending support member 6 of the second pair so as to anchor it into place.

It will be appreciated that any of the above described anchor members may be any suitable type of anchor member, including slings, anchor bolts, etc (e.g. via karabiners or any other suitable coupling devices).

Each laterally extending support strap 32 of the first and second mesh panels 11, 12 of the first row is substantially aligned in the longitudinal direction with a respective laterally extending support strap 32 of the first and second mesh panels 13, 14 of the second row respectively.

Figure 6:
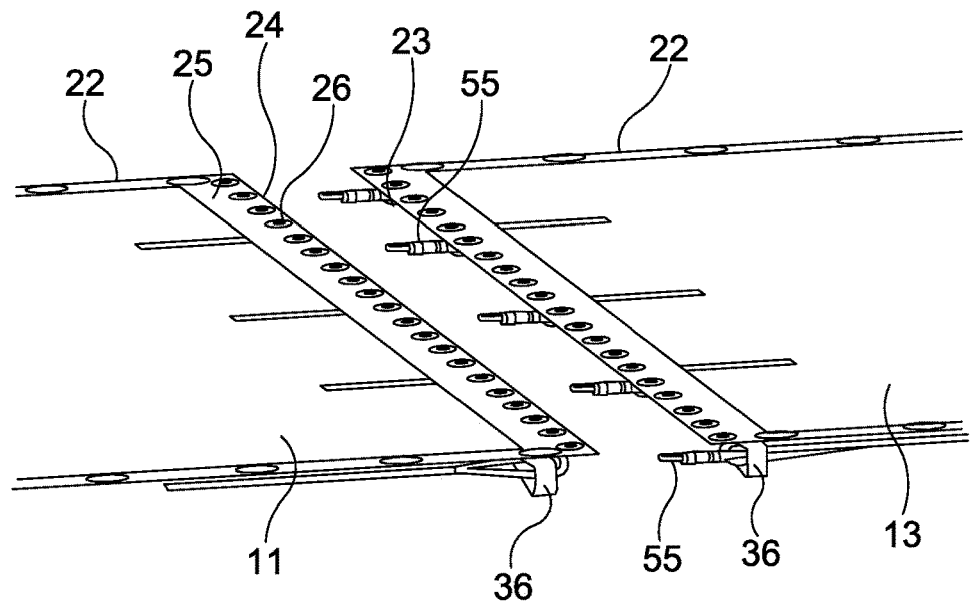
FIG. 6 shows an upper perspective view of laterally adjacent sections of two laterally adjacent mesh panels of the platform assembly of FIG. 1 shown spaced apart in the lateral direction for illustrative purposes.
Figure 7:
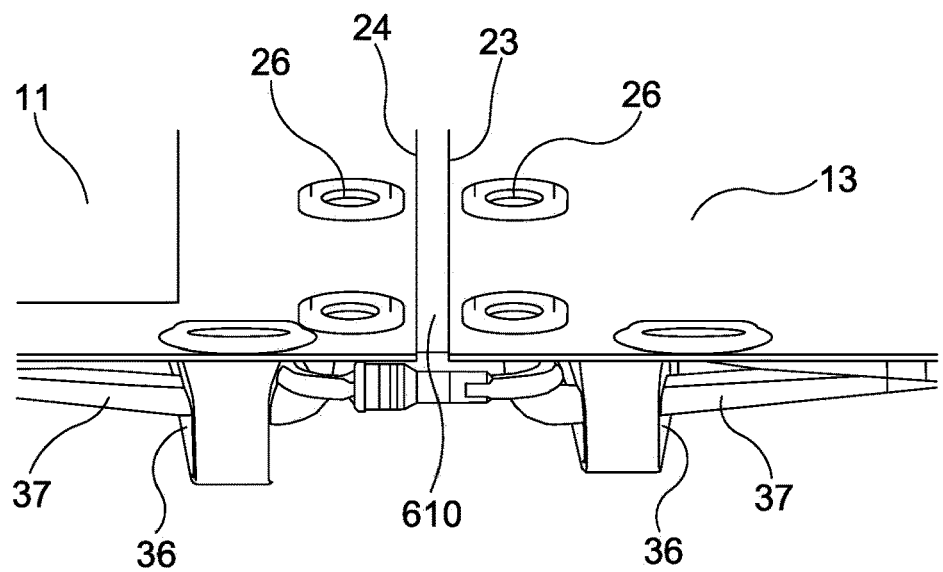
FIG. 7 shows an enlarged upper perspective view of a section of the mesh panels shown in FIG. 6, where the mesh panels are connected together in the lateral direction.

Referring to FIGS. 1, 6 and 7, for each of the first and second mesh panels 11, 12 of the first row, a second end of each of the laterally extending support straps 32 (at the second longitudinally extending side 24 of the mesh panel 11, 12) is attached to a respective adjacent first end of a (longitudinally aligned) laterally extending strap 32 (at the first longitudinally extending side 23 of the mesh panel 13, 14) of the first and second mesh panels 13, 14 of the second row respectively by a karabiner 55.

Each karabiner 55 passes through a pair of adjacent eyelets 37 of a respective pair of laterally extending support straps 32.

Similarly, the longitudinally extending support straps 31 of the first mesh panels 11, 13 of the first and second rows are substantially aligned in the lateral direction with the longitudinally extending support straps 31 of the second mesh panels 12, 14 of the first and second rows respectively.

For each of the first mesh panels 11, 13 of the first and second rows, a second end of each of the longitudinally extending support straps 31 (at the second laterally extending side 22 of the mesh panel 11, 13) is attached to a respective first end of an adjacent (laterally aligned) longitudinally extending strap 31 (at the first laterally extending side 21) of the second mesh panels 12, 14 of the first and second rows by a karabiner 55. Each karabiner 55 passes through a pair of adjacent eyelets 36 of a respective pair of longitudinally extending support straps 31.

The attachment of the support straps 31, 32 of each panel together form an underlying support structure that provides support and rigidity to the platform 45 formed by the mesh panels 11 to 14.

In this respect, it will be appreciated that for corresponding (laterally aligned) longitudinally extending support straps 31 of longitudinally adjacent panels, the attachment of adjacent ends of the straps provides a substantially continuous load bearing member that extends across the longitudinal extent of the platform 45. This allows for the transmission of loads across the longitudinal extent of the platform 45.

Similarly, it will be appreciated that for corresponding (longitudinally aligned) laterally extending support straps 32 of laterally adjacent panels, the attachment of adjacent ends of the straps provides a substantially continuous load bearing member that extends across the lateral extent of the platform 45. This allows for the transmission of loads across the lateral extent of the platform 45.

It will be appreciated that, where there are more than two rows, or columns, of said panels, the longitudinally and laterally extending support straps 31, 32 of mesh panels in adjacent rows, or columns, may be connected in the same way as described above.

As can be seen in FIG. 7, when laterally adjacent mesh panels are connected to each other by said karabiners 55, there is a small gap 610, in the lateral direction, between the adjacent sides of the mesh panels.

As will now be described, for each pair of adjacent mesh panels, this gap 610 is covered by a respective longitudinally extending infill strip 611 (see FIGS. 8 and 9).

Figure 8:
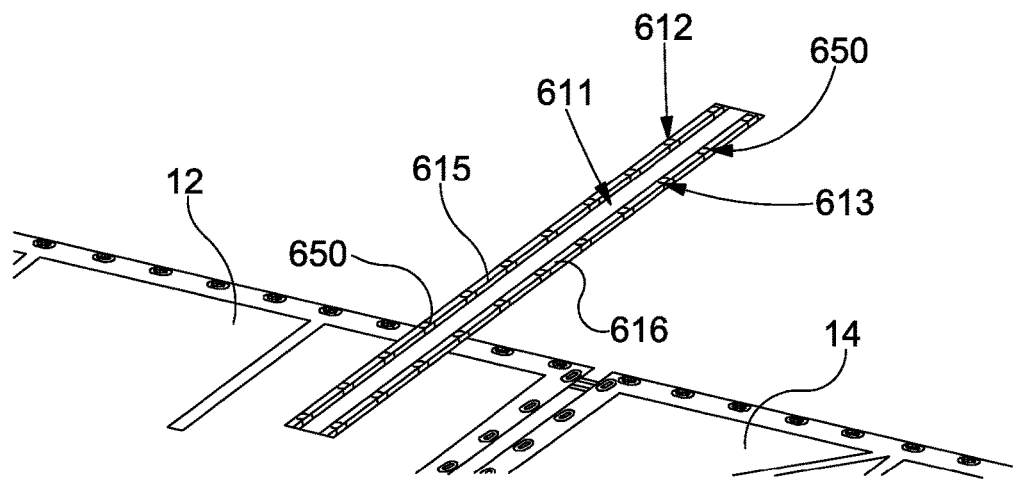
FIG. 8 shows an upper perspective view of a section of the platform assembly of FIG. 1, showing an infill strip of the platform assembly being lowered into position on the platform assembly.
Figure 9:
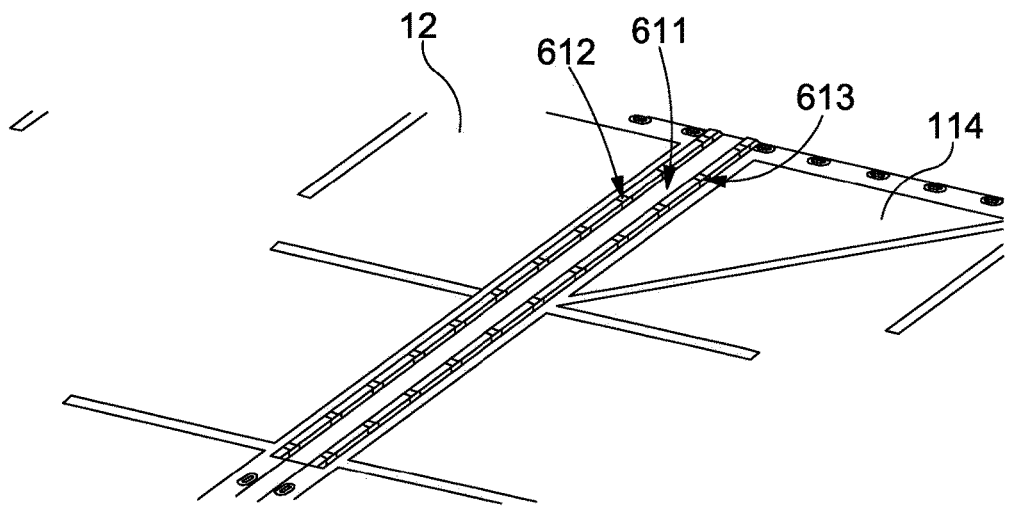
FIG. 9 shows a view corresponding to that of FIG. 8 but where the infill strip has been lowered into position on the platform assembly.

Referring to FIGS. 8 and 9, each infill strip 611 comprises a longitudinally extending strip of material provided with first and second rows 612, 613 of apertures 650 that are provided along first and second longitudinally extending sides of the infill strip 611 respectively.

Each infill strip 611 has a length, in the longitudinal direction that is substantially the same as the longitudinal lengths of the respective adjacent panels. Furthermore, the apertures 612 613 in each respective row are uniformly spaced, in the longitudinal direction, and by substantially the same amount as the apertures 26 in the attachment strip 25 for each panel.

For each set of laterally adjacent panels, an infill strip 611 is placed over the adjacent sides of the panels, such that it spans the lateral gap 610 between the panels, with the apertures 612 of the first row being substantially aligned with, and overlying, the apertures 26 in the attachment strip 25 along the longitudinally side of one panel and the apertures 613 of the second row being substantially aligned with, and overlying, the apertures 26 in the attachment strip 25 of a laterally adjacent side of an adjacent panel.

Figure 10:
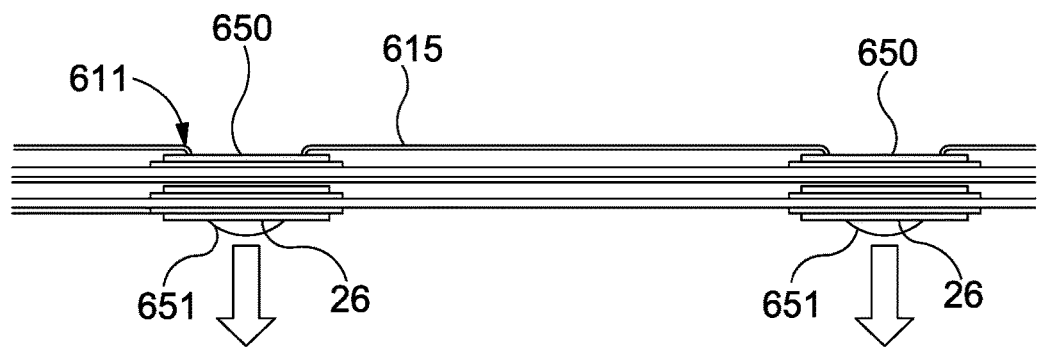
FIG. 10 shows a side elevational view of adjoining sections of the laterally adjacent panels shown in FIGS. 8 and 9 with the infill strip in place and attached to the adjacent panels.
Figure 11:
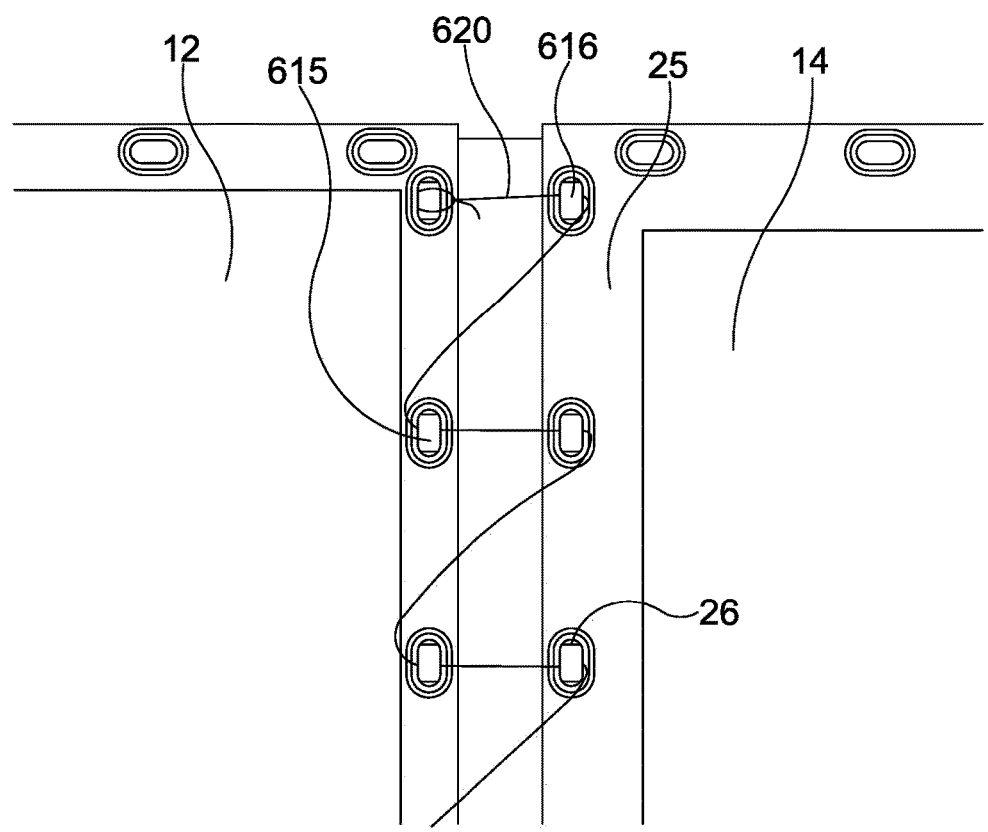
FIG. 11 shows an under plan view of the panels and attached infill strip of FIG. 10.

Referring also to FIGS. 10 and 11, first and second longitudinally extending connecting straps 615, 616 provided on the upper surface of the infill strip 611 extend, in the longitudinal direction, over the first and second rows 612, 613 of said apertures 650 in the infill strip 611.

Sections of the connecting straps 615, 616 that pass over each respective aperture 650, are pushed through the apertures 650 to form a loop 651 that protrudes below the lower surface of the mesh panel.

A connecting cord 620 is laced along the first and second rows 612, 613 of apertures 650 in the infill strip 611 such that it connects adjacent said loops 651 of the connecting straps 615, 616 together. In the described embodiment the cord 620 is laced in zig-zagged pattern. However, it will be appreciated that any suitable pattern may be used.

The infill strip 611 and connecting cord 620 serve to connect the adjacent sides of the mesh panels together and to cover the gap 610 between the adjacent panels.

It will be appreciated that, in the same way, laterally extending infill strips 611 may be used to connect longitudinally adjacent panels together and to cover any longitudinal gap between these panels.

Reference will now be made to FIG. 1 and to FIG. 12, which shows a schematic side view of the platform assembly and building structure shown in FIG. 1 (this view only shows a single side view the platform assembly 1 but it will be appreciated that each column of panels has the same arrangement).

As stated above, for each laterally extending support strap 32, of the first and second mesh panels 13, 14 of the second row, a laterally extending section 40 of the strap 32 is stitched to the membrane 30 of the respective panel (passing through the overlying reinforcing strip 51) at a position inboard of the second lateral end 100 (see FIG. 12) of the strap 32.

Figure 12:
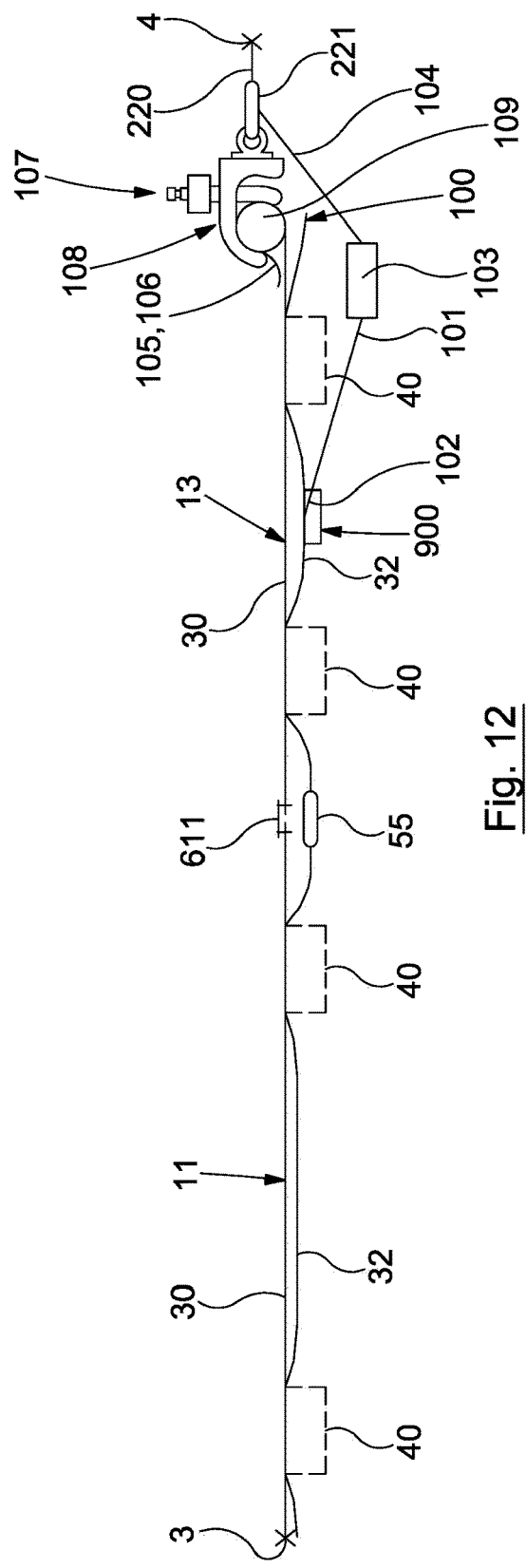
FIG. 12 shows a schematic side view of the platform assembly and building structure shown in FIG. 1.
Figure 13:
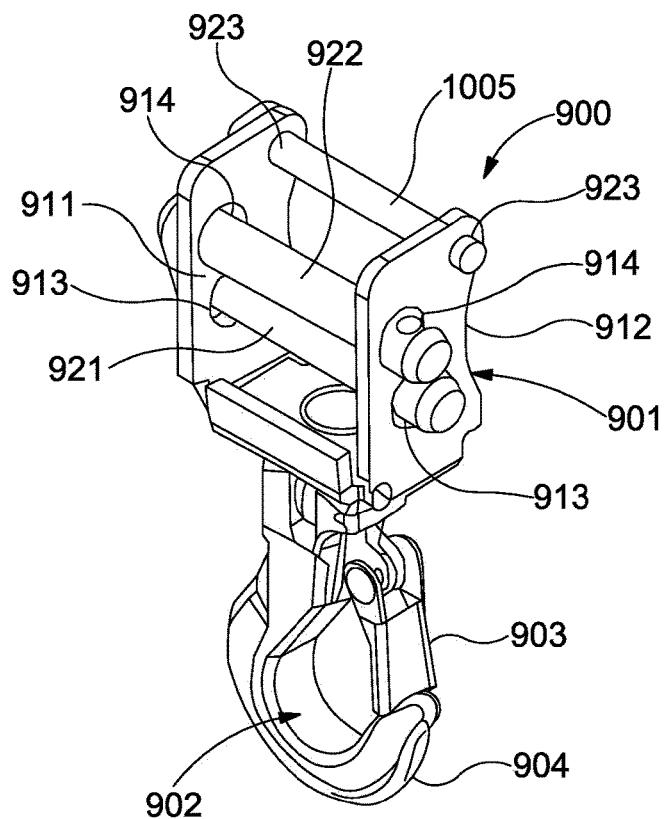
FIG. 13 shows a perspective view of a clutch of the platform assembly shown in FIGS. 1 to 12.

For each of these laterally extending support straps 32, the second lateral end 100 is not attached to the second longitudinally extending support member 4, but is a free end (as shown in FIG. 12).

Each of these laterally extending support straps 32 is attached at a point 102 on the strap 32 that is inboard of the (outboard) section 40 at which the strap 32 is attached to the membrane 30, to a first end of a tensioning strap 101.

In the described embodiment the attachment points 102 on said support straps 30 lie along an axis 102' that is substantially parallel to the longitudinal axis of the second longitudinally extending support member 4 (see FIG. 1). Alternatively, the attachment points 102 may lie along a different axis, or may not be aligned along an axis, as desired.

The tensioning strap 101 is attached to the point 102 on the support strap 32 by an attachment member in the form of a clutch 900.

Referring to FIGS. 13 to 17, the clutch 900 comprises a strap attachment section 901 attached to an attachment hook 902. It will be appreciated that in FIGS. 15 to 17 the support strap 32 is shown truncated for illustrative purposes.

The attachment hook 902 is selectively openable and closeable by an arm 903 that is rotatable relative to a hook body 904. The attachment hook 902 is attached to the first end of the tensioning strap 101, which is linked around the hook body 904, and the arm 903 moved to the closed position to secure the strap 101 to the hook 902.

The strap attachment section 901 is attached to the laterally extending support strap 32 at a position inboard along the length of the support strap 32, as will now be described.

The strap attachment section 901 comprises first and second opposed plates 911, 912 each provided with first and second circular apertures 913, 914. The first and second apertures 913, 914 of the plates 911, 912 are aligned such that they are coaxial with each other. First and second substantially cylindrical mounting pins 921, 922 are receivable in the aligned first and second apertures 913, 914 respectively.

The plates 911, 912 are also each provided with a third circular aperture 923. The third apertures 923 of the plates 911, 912 are aligned such that coaxial with each other. A guide pin 1005 is received in the aligned third apertures 913, 914.

Figure 14:
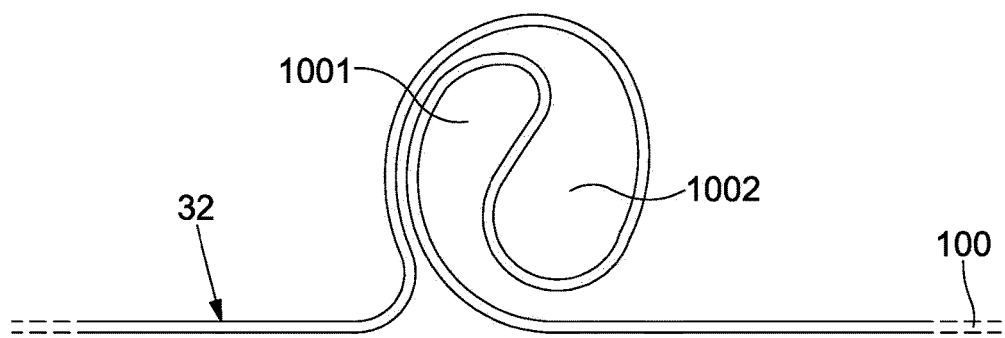
FIGS. 14 to 17 show the sequence of attachment of the clutch of FIG. 13 to a support strap of the platform assembly of FIGS. 1 to 12.

In order to attach the strap attachment section 901 to a position along the laterally extending support strap 32, the strap 32, is pinched at said inboard position along its length and folded about itself to define first and second loops 1001, 1002 as shown in FIG. 14. This looped section of the laterally extending support strap 32 is then inserted between the first and second plates 911, 912 of the strap attachment section 901 of the clutch 900. At this point, the first and second mounting pins 921, 922 are not disposed within the respective first and second apertures 913, 914 in the plates 911, 912.

Figure 15:
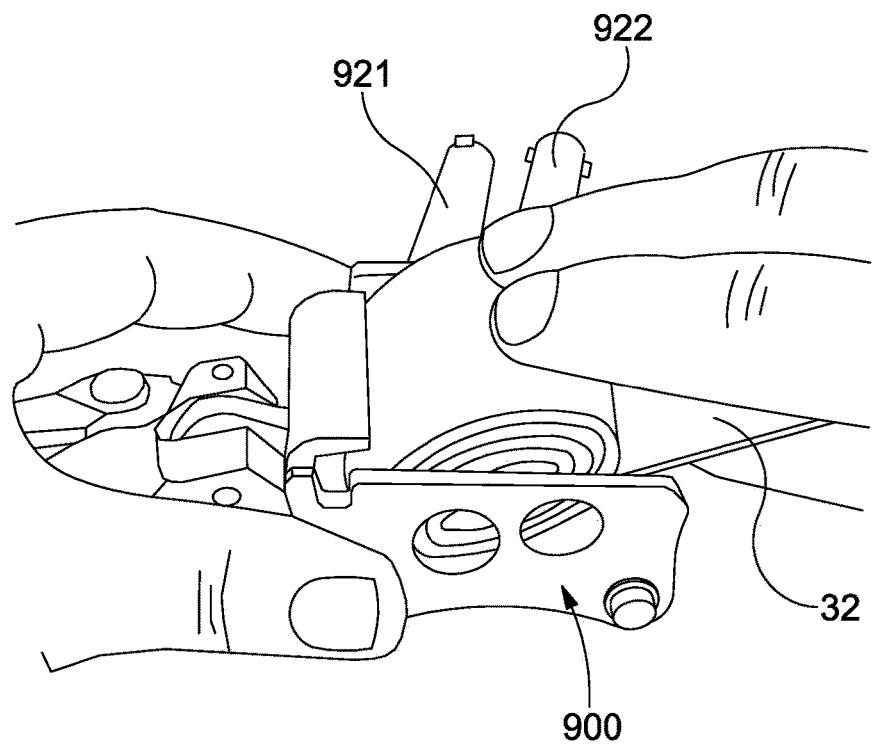
Figure 16:
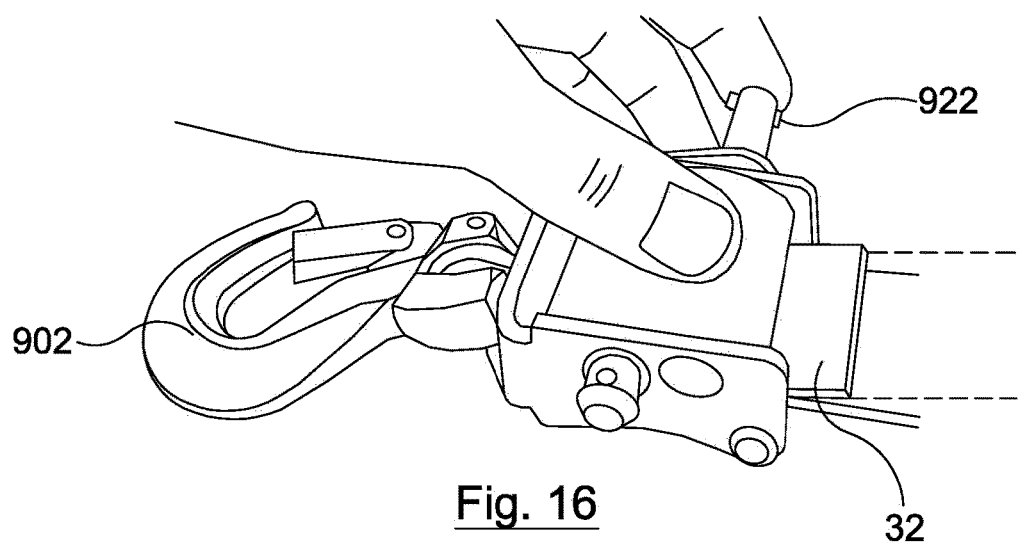
Figure 17:
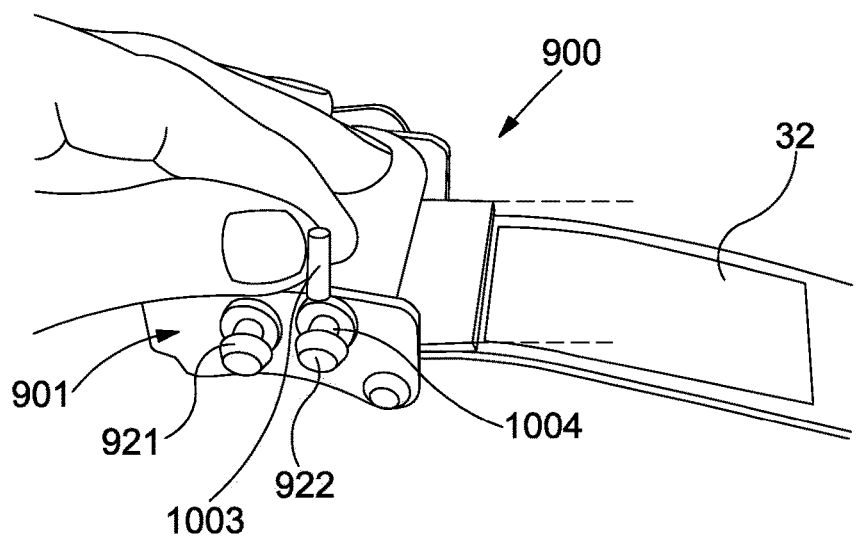
Figure 18:
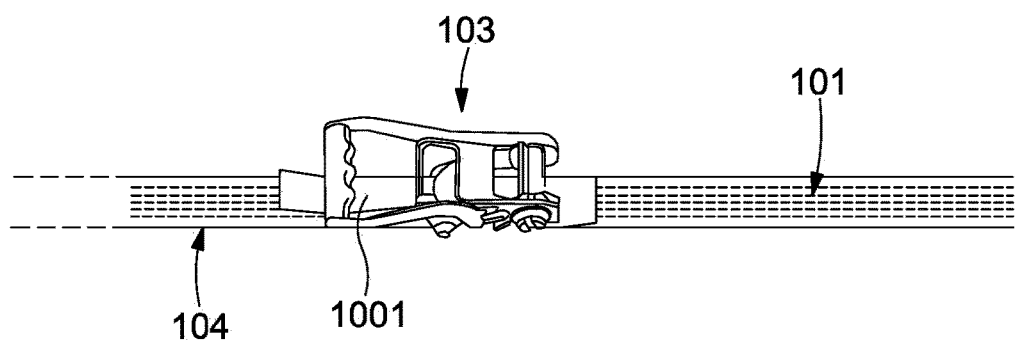
Figure 19:
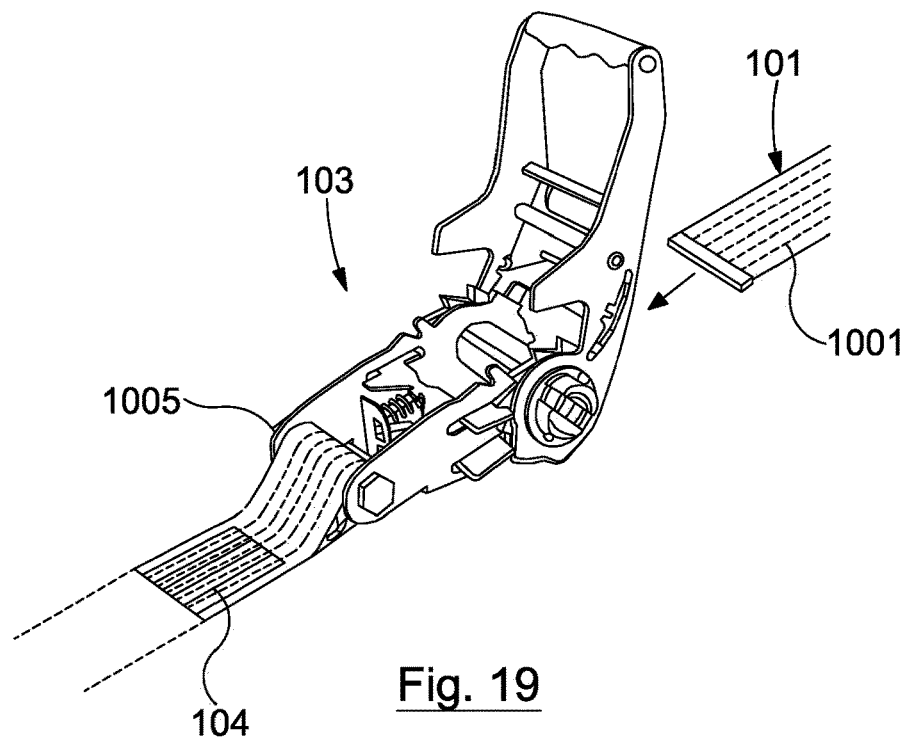

The loops 1001, 1002 of the looped section of the support strap 32 are aligned with the first and second apertures 913, 914, in the first and second plates 911, 922, as shown in FIG. 15. The first and second pins 921, 922 are then inserted through the first and second apertures in the first plate 911 respectively, through the first and second loops 1001, 1002 in the looped section of the support strap 32 and into the aligned first and second apertures 913, 914 in the opposed second plate 912. The mounting pins 921, 922 are then secured in place, in the respective apertures, by slotted tensioned pins 1003, as shown in FIG. 17. They are passed through respective bores 1004 in the pins 91, 92 disposed outboard of the first and second places 911, 922 and extending along a longitudinal axis that is substantially perpendicular to the longitudinal axis of the mounting pins 921, 922.

The looped section of the support strap 32 is retained between the pins 921, 922 and passes out of the strap attachment section 901, passing over the guide pin 1005 as it does so the pins 91, 92 within the bores. The first and second loops 1001, 1002 pass tightly around the pins 921, 922, which forms a friction lock with the loops 1001, 1002 of the strap 32.

Accordingly, the clutch 900 allows the first end of the tensioning strap 101 to be attached at any point 102 along the support strap 32.

It will be appreciated that the invention is not limited to the specific type of clutch 900 shown in FIGS. 13 to 17 and that any suitable type of clutch may be used that allows a first end of a tension strap 101 to be attached at any point along the length of a support strap 32, without having to thread ends of the support strap 32 through the clutch 900.

Each tensioning strap 101 is attached, at a second end section, to a respective tensioning device 103. In the currently described embodiment, the tensioning device is a ratchet tensioner 103, as shown in FIGS. 18 to 21.

A first end 1005 of the ratchet tensioner 103 is attached to a first end of a connecting strap 104 that connects the ratchet tensioner 103 to the second longitudinally extending support member 4 via a karabiner 221 and a sling 220 that connects the karabiner 221 to the second longitudinally extending support member 4 (by being looped around said support member 4) or any other type of anchor member.

A first end section 1001 of the tensioning strap 101 is received in a second end of the ratchet tensioner 103.

The ratchet tensioner 103 comprises a shaft 1009 arranged to rotate about an axis 1020. The shaft 1009 is provided with a slot 1021 which receives the first end section 1001 of the tensioning strap 101.

Figure 20:
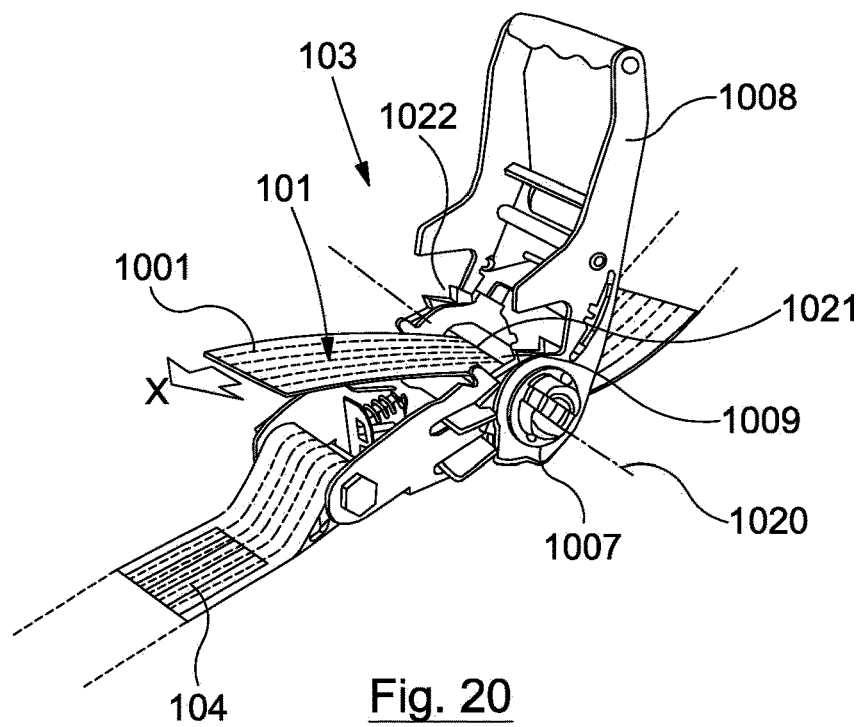
Figure 21:
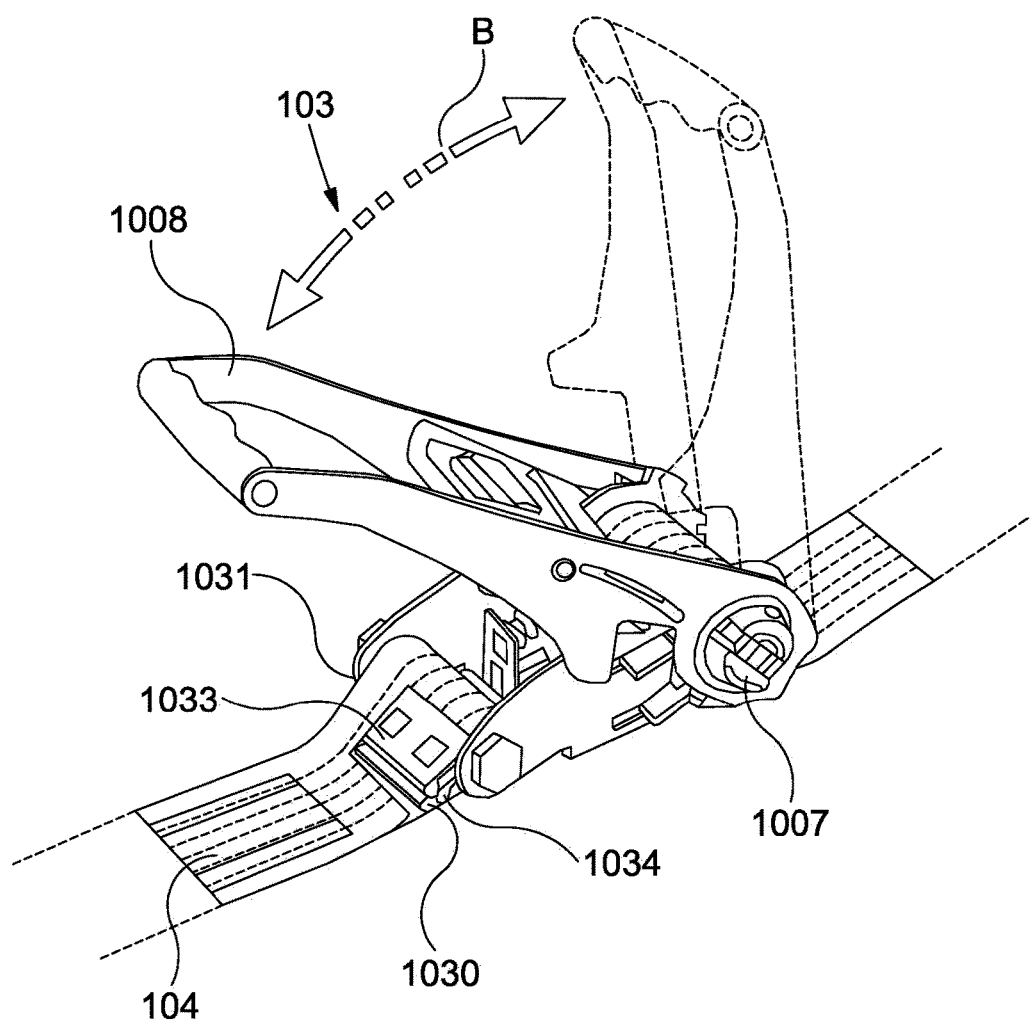

The shaft 1009 is coupled, via a gear tooth arrangement 1022 to a lever 1008 such that back and forth rotation of the lever 1008 in the direction of arrow B shown in FIG. 21, rotates the shaft 1009 in a clockwise direction (when viewed in the orientation shown in FIG. 20. This acts to wrap the first end section 1001 of the tensioning strap 101 around the shaft 1009 thereby tensioning the strap 101. When a desired amount of tension has been placed in the tensioning strap 101, the lever 1008 is moved to a locked position, thereby holding the strap 101 in place, with the desired amount of tension.

The tensioner may be a ratchet tensioner substantially as described in European patent application no. 19910106425.

A tension force indicator device 1030 (see FIG. 21) is disposed in the looped eyelet 1031 at the first end of the connecting strap 104 that is looped around a pin at the first end of the ratchet tensioner 103.

The tension force indicator device 1030 comprises first and second arms 1033, 1034 connected together at one end by a curved resilient section. The first and second arms 1033, 1034 and the curved section have a generally corresponding shape to the inner surface of the looped section of the strap 104. As tension is applied to the strap 101 it is also applied to the strap 104. This causes the looped section of the strap 104 to contract, which moves the first and second arms 1033, 1034 of the tension force indicator device 1030 towards each other. A scale is provided on the tension force indicator that allows the distance between the first and second arms 1033, 1034 to be translated into a tension in the strap 104. Accordingly, the tension force indicator device 1030 allows the tension in the strap 104 (and therefore in the tensioning strap 101) to be measured in a convenient and compact way. Such a tension force indicator device 1030 is advantageous in that it is relatively cheap and easy to use.

Such a tension force indicator device 1030 is known in the art and therefore it is not necessary to describe it in any further detail here.

The tension force indicator device may be a tension force indicator device as described in EP20030727118.

The ratchet tensioner 103 is shown schematically in FIGS. 12, 24 and 25 as a rectangle 103.

It will be appreciated that any suitable type of tensioning mechanism may be used, such as a hoist, e.g. a lever hoist or chain hoist.

Advantageously applying the tension from the ratchet tensioner 103 at a point 102 that is inboard of said section 40 at which the support straps 32 are attached to the panel (towards the outboard end of the panel) prevents the tension applied to the support straps 32 from also being directly applied to the section of the panel outboard of said attachment section 40.

Referring to FIG. 1, the second longitudinally extending sides 24 of the first and second mesh panels 13, 14 of the second row together define a second longitudinally extending side 66 of the platform 45.

For each of the first and second mesh panels 13, 14 of the second row, a longitudinal section 105, 106 of the panels 13, 14, provided towards the respective second longitudinally extending sides 24 of the panels 13, 14 is folded back over itself, in the inboard direction. This folded over section defines a longitudinally extending peripheral side 300 (see FIG. 1) of the platform 45. Each folded over section 105, 106 is attached to the second longitudinally extending support member 4 by a plurality of clamp devices 107 distributed along the longitudinal length of the longitudinally extending peripheral side 300.

Referring to FIGS. 22 and 23, each clamp device 107 comprises a clamp 108 and a grip member 109. The clamp 108 comprises first and second clamping members 110, 111 that each have respective clamping surfaces 112, 113. The second clamping member 111 is rotatably mounted to the first clamping member 110 on a rotational pin about an axis Z. The second clamping member 111 is movable towards and away from the first clamping member 110, by rotating about said axis Z, so as to vary the distance between the respective clamping surfaces 112, 113.

In this regard, the first and second clamping members 110, 111 are biased away from each other by a resiliently deformable biasing member in the form of a spring (not shown).

The second clamping member 111 is movable towards the first clamping member 110 by an actuation mechanism comprising a threaded nut 114 mounted on a complimentary threaded shaft 115. Rotation of the nut 114 relative to the shaft 115 in a first direction causes the nut 114 to travel along the shaft 115. As it does so, the nut 114 abuts a lever arm 1050 that is coupled to the second clamping member 111 such that the second clamping member 111 is pivoted towards the first clamping member 110 such that the distance between the respective clamping surfaces 112, 113 decreases. It will be appreciated that rotation of the nut 114 is in a second direction (opposite to the first direction) moves the clamping surfaces 112, 113 away from each other, so as to open the clamp device 107.

It will be appreciated that the first and second clamping members 110, 111 may be actuated by any suitable actuation means.

The first and second clamping members 110, 111 are actuatable between an open position, in which the clamping members 110, 111 are distal to each other and a closed position in which the clamping members 110, 111 are proximal to each other.

The grip member 109 is a substantially solid and substantially cylindrical member extending along a longitudinal axis 131. An outer peripheral surface 140 of the grip member 109 is arcuate, with a substantially constant radius. The outer peripheral surface 140 is provided with a coating 141 which has a relatively high coefficient of friction. The coefficient of friction that is greater than the coefficient of friction of the platform 45.

In the currently described embodiment the coating is a coating of Secutex polyurethane, Neoprene or any other suitable coating.

Alternatively, or additionally, an insert of a material of a relatively high coefficient of friction (such as the above materials) may be provided between the grip member 109 and the platform 45.

The use of the high friction coating and/or insert advantageously increases the frictional force exerted by the clamp on the platform 45, thereby allowing the platform 45 to support a higher load without the platform 45 being pulled out of the clamp device 107.

The outer peripheral surface 140 of the grip member 109 has a curved shape of a substantially constant diameter. The curved shape is complimentary to the shape of an inner curved surface defined by the opposed clamping surfaces 112, 113 of the first and second clamping members 110, 111.

The grip member 109 is received between the clamping surfaces 112, 113 of the first and second clamping members 110, 111 with said end section 105, 106 of the platform clamped between the peripheral surface 141 of the grip member 19 and the surrounding adjacent clamping surfaces 112, 113 of the first and second clamping members 110, 111.

In this regard, the end section 105, 106 of the platform 45 is wrapped around, and is in contact with, a portion of the circumference of the peripheral surface of the grip member 109. In the described embodiment, each end section 105, 106 of the platform 45 is wrapped around, and is in contact with, greater than 75% of the circumference of the peripheral surface of the grip member 109.

This provides a relatively large surface area of contact with the platform which thereby spreads the load exerted on the platform 45. This allows the platform 45 to support higher loads.

The side section 105, 106 of the platform 45 passes out of the front of the clamp 108, such that the respective second longitudinally extending sides 24 of the panels 13, 14 are disposed external to the clamp 108.

Each clamp device 107 is arranged to hold the side section 105, 106 of the platform 45 in place using only a frictional force exerted on the section of the platform 45. In this regard, each clamp device 107 is arranged to hold the side section 105, 106 of the platform 45 in place without penetrating the side section of the platform 45.

As can be seen from FIG. 1, said folded over sections 105, 106 of the platform 45 are clamped to the second longitudinally extending support member 4 by the plurality of said clamp devices 107 distributed in the longitudinal direction, at longitudinal positions corresponding to those of the respective laterally extending support straps 32.

Each clamp device 107 receives a respective grip member 109, with the grip members 109 having longitudinal axes that are co-axial and together form an axis 'D'.

Each clamp 108 has an attachment member in the form of a metal ring that forms an eyelet 302, provided on opposite side of the clamp 108 to the first clamping member 110. The karabiners 221, that attach the connecting straps 104 to the second longitudinally extending support member 4, are each received by the eyelet 302 of a respective clamp, thereby also attaching the clamp device 107 to the second longitudinally extending support member 4 (via the sling 220).

In this way, each clamp 108 (and therefore each clamp device 107) is attached to the second longitudinally extending support member 4 at the same position, along the support member 4, as a corresponding connecting strap 104 from the ratchet tensioner 103.

The above described clamping arrangement is advantageous in that it allows for any slack in the membrane 30 of each panel 13, 14, towards the respective second longitudinally extending side 24 of the panel 13, 14, to be taken up by the clamp device 107 and held taut by the clamp device 107.

In this regard, the membrane 30 of each panel 13, 14 can be pulled through the clamp to provide a desired tautness of the membrane 30 before the clamp members 110, 112 are moved to a closed position to clamp the membrane 30 in place.

This is advantageous in that it allows the platform 45 to be adjusted to have a desired tautness. In this regard, it is generally desirable to have the platform 45 taut but not held under a significant amount of tension. It is generally desirable that the platform 45 is held under a lower tension than the underlying support straps 32, which require higher tension so as to provide the above described support structure for the platform 45. In this respect, in the above clamping arrangement the clamp devices 107 and the clutches 900 are separate to each other. In this regard, each tensioning device 103 does not clamp the platform and each clamp device 107 does not tension the support straps 32.

In this respect, the clutches 900 together form an attachment assembly and the clamp devices 107 together form a clamp assembly and the clamp assembly is positionable independently of the attachment assembly.

This advantageously allows the side sections of the membrane 30 of each panel 13, 14, towards the respective second longitudinally extending side 24 of the panels 13, 14, to be attached to the second laterally extending support member 4 independently of where the ratchet tensioners 103 are attached to the laterally extending support straps 32 (by the clutches 900).

Accordingly, the tension in said sections of the membrane 30 and in the laterally extending support straps 32 can be adjusted independently of each other. This is advantageous since, as discussed above, it is generally desirable for the platform 45 to merely be held taut whereas it is desirable for the straps 32 to be held under tension to provide an underlying support structure for the platform 45.

Furthermore, in order to be able to provide a sufficient tensioning force on the laterally extending straps 32, it can be necessary for the ratchet tensioner 103 to be attached to the laterally extending straps 32 at a position inboard of the second laterally extending ends of the support straps 100 by a certain minimum distance in order to provide enough room for the support straps 32 to be stretched in the outboard direction to provide the desired tension in the support straps 32.

In view of this requirement, it is generally necessary for the ratchet tensioner 103 to be attached to each support strap 32 at section 102 (via the clutches 900) inboard of the second laterally extending side 24 of the panel 13, 14 by at least 12.5% of the lateral length of the respective panel 13, 14.

This could otherwise leave a relatively large lateral gap between the point of attachment 102 and the second longitudinally extending support member 4. Because the membrane 30 of each panel 13, 14 is attached (by the clamps 108), to the second longitudinally extending support member 4, independently of the clutches 900, the membranes 30 may be attached to the second longitudinally extending support member 4 at a different lateral position to the support straps 32 (via the clutches 900 and the ratchet tensioner 103). Accordingly, the second lateral side 24 of each panel 13, 14 may be attached closer to the second longitudinally extending support member 4 than the locations 102 at which the clutches 900 are attached to the support straps 32, thereby allowing the platform 45 to extend closer to the second longitudinally extending support member 4 than would otherwise be possible. Accordingly, using this arrangement, the platform 45 can extend, in the lateral direction, substantially to the second longitudinally extending support member 4. This prevents, or reduces, a gap that would otherwise be present between the side of the platform 45 and the second longitudinally extending support member 4. This provides both safety and aesthetic advantages. In this regard, the clamp devices 107 are positioned closer to said support member 4 than the attachment locations 102 of the tensioning devices 103.

Furthermore, the above clamping arrangement allows for the peripheral side 300 of platform 45, formed by the folded over side section of the platform 45, to be shaped as desired. For example, at different positions along the longitudinal length of the panels 13, 14, the lateral end sections of the membranes 30 may be overlapped by varying amounts so as to vary the lateral position of the peripheral side 300 formed by the folded over section of the panels 13, 14. This advantageously allows the membranes 30 of the panels 13, 14 are to be fit to building structures 2 of different shapes, including non-uniform shapes.

The peripheral side 300 of the platform 45 defined by the folded section 105, 106 has a shape that is complimentary to that of the second longitudinally extending support member 4. In this regard, the peripheral side 300 extends along a longitudinal axis that is substantially parallel to the longitudinal axis of said support member 4. The peripheral side 300 is closer to said support member 4 than the clutches 900.

As stated above, the second longitudinally extending support member 4 is inclined towards the first longitudinally extending support member 3. It will be appreciated that, by varying the amount of lateral overlap in the folded side sections 105, 106, with longitudinal position, this allows the peripheral side 300 to closely match the second longitudinally extending support member 4. In addition, this variation in the effective lateral length of the panels 13, 14, allows the panels 13, 14 to be substantially parallel to the panels 11, 12 of the first row, whilst still providing an inclined peripheral side 300 that that matches the second longitudinally extending support member 4.

The above advantages are illustrated further in the embodiment shown in FIG. 27, in which the clamp devices 107 (and the respective grip members 109) are positioned with varying positions in the lateral direction so as to produce a folded over section that defines a peripheral edge 300 that is curved as it extends in the lateral direction.

It will be appreciated that the above arrangement of attaching a platform 45 to a support member and tensioning support straps to the support member, independently of the attachment of the membranes 30 to the support member 4 may be used in a wide variety of configurations and is not limited to the arrangement shown in the above embodiments.

For example, FIG. 24 shows a schematic view of a platform assembly according to a second embodiment the present invention, installed on a building structure.

This embodiment of the invention is identical to the first embodiment except for the differences described below. Corresponding features are given corresponding reference numerals.

In the embodiment shown in FIG. 24, the laterally extending support straps 32 and the membranes 30 of the first and second mesh panels 11, 12 of the first row are attached to the first longitudinally extending support member 3, in the same way as the support straps 32 and membranes 30 of the first and second mesh panels 13, 14 of the second row are attached to the first longitudinally extending support member 4. In this regard, a side section of the first and second mesh panels 11, 12 of the first row is folded inboard, over itself, and is clamped by a plurality of said clamping devices 107 attached to the first longitudinally extending support member 3 In addition, each laterally extending support strap 32 is attached, at a section inboard of the end of the strap 32 to a ratchet tensioner 103 via a said clutch 900 that is arranged to apply a desired amount of tension to the strap 32. Each ratchet tensioner is attached to the first longitudinally extending support member 3 by said strap 104 and karabiner 221.

The arrangement shown in FIG. 25 is identical to that shown in FIG. 12 except in that there is an additional, intermediate, longitudinal row of mesh panels 400 provided between the first and second rows of mesh panels. The laterally extending support straps 32 of the intermediate row 400 of mesh panels are connected at each end to respective laterally extending webs 32 of adjacent panels by respective karabiners 55, as for the first embodiment. Similarly, adjacent mesh panels are connected together, along their adjacent sides, by said infill strips 611.

It will be appreciated that, in this embodiment, the first end of each tensioning strap 101 is attached to a respective karabiner 55, that is attached to a laterally extending support strap 32. Accordingly no clutches 900 are used in this embodiment, with the tensioner 103 being attached to the respective support strap 32 via the karabiner 55.

FIGS. 28A to 28C show different ways in which a side section of a mesh panel, of any of the above described embodiments of the platform assembly may be curved around the outer peripheral surface 140 of the grip member 109. In FIG. 28A the first and second clamping members 110, 113 of the clamp are shown in dotted outline. In FIGS. 28B and 28C the first and second clamping members are in the same location relative to the grip member 109 but are omitted for illustrative purposes.

In FIG. 28A, the membrane 30 is passed around approximately half the circumference of the outer peripheral surface 140 of the grip member 109, as a single layer. The layer is clamped between the outer peripheral surface 140 of the grip member 109 and the clamping surfaces 112, 113 of the first and second clamping members 110, 111 as described above.

In FIG. 28B, the mesh 30 again extends approximately half way around the circumference of the outer peripheral surface 140 of the grip member 109, but is folded back on itself such that there is a double layer of said membrane 30 disposed around said half circumferential section of the outer peripheral surface 140 of the grip member 109, that is clamped between the clamping surfaces 112, 113 of the first and second grip members and the outer peripheral surface 140 of the grip member 109.

In FIG. 28C the membrane 30 is folded about itself twice, as it extends substantially around the circumference of the outer peripheral surface 140 of the grip member 109 so as to form four layers of the membrane 30 that are clamped between the clamping surfaces 112, 113 of the first and second grip members and the outer peripheral surface 140 of the grip member 109.

FIG. 29A shows a first configuration of a sling 603 that may be used as an anchor to a support member of the support structure, for example for a said tensioning device 103 or for direct attachment of a support strap.

The sling 603 is a looped strip of material that has first and second looped ends 606, 607.

In FIG. 29A the sling 603 is looped around a support member 154, in this case in the form of an I-beam, and the second looped end 607 is passed through the first looped end 606. It will be appreciated that the sling 603 may be so looped around any of the support members 3 to 6 of any of the above described embodiments.

The second looped end 607 is passed in a straight line through the first looped end 606 and is not folded back on itself about the first looped end 606.

The second looped end 607 is an anchor point to attach a device e.g. a karabiner that attaches an end of a said support strap 31, 32, to the support member 154. When a force in the direction of arrow X is applied to the second looped end 607 it acts to tighten the sling 603 around the support member 154.

FIG. 29B shows a second configuration of the sling 603. This configuration is the same as the first configuration except in that the second looped end 607 is folded back on itself about the first looped end 606. This is advantageous in that if the sling 603 is rotated about the support member 154, the distance between the second looped end 607 and the support member 154 is varied.

This is illustrated in FIG. 29C, in which the sling 603 has been rotated in the clockwise direction B, about the support member 154 relative to its position in FIG. 29B. It can be seen that this rotation of the sling 603 moves the second looped end 607 closer to the support member 154.

This provides for more flexibility during the assembly process.

The method of installation of the platform assembly 1 to the building structure 2 will now be described, with reference to FIG. 1.

As a first step, the size and shape of the space defined between the support members 3 to 6 of the building structure is measured and a desired layout of the mesh panels calculated. The layout is calculated so as to use as many "full" panels as possible, using panels having folded over side sections, as described above, where necessary in order to fit the platform 45 to the space.

In the embodiment of FIG. 1, the first longitudinally extending side 23 of the first panel 11 of the first row is attached, along its length, to the first longitudinally extending support member 3 by attachment of the laterally extending support straps 32 to the first longitudinally extending support member 3 via said slings 603 (by the connection of karabiners with the respective eyelets 37—as described above).

The second panel 12 of the first row is then attached to the first panel 11 of the first row by the attachment of adjacent ends of the (laterally aligned) longitudinally extending straps 31 of the panels 11, 12, with karabiners 55, as described above.

The first longitudinally extending side 23 of the second panel 12 of the first row is then attached, along its length, to the first longitudinally extending support member 3 by attachment of the laterally extending support straps 32 to the first longitudinally extending support member 3 via said slings 603.

Ends of the longitudinally extending straps 31 of the first and second panels 11, 12 of the first row are then connected to the first and second laterally extending support members 5, 6 respectively by said slings 604 and eye bolts 605 as described above. In this regard the longitudinally extending straps 31 of the first and second panels 11, 12 are sequentially attached, in the direction from the first longitudinally extending support member 3 to the second longitudinally extending support member 4, to the respective support member 5, 6.

If the longitudinally extending straps 31 are connected to respective tensioners then then may then be tensioned so as to provide a support platform that can then bear the weight of workers installing the next section of the platform.

The first and second panels 13, 14 of the second row are then respectively attached to the first and second panels 11, 12 of the first row by the attachment of the adjacent ends of the laterally extending straps 32, by karabiners 55, as described above. The infill strips 611 may be installed at this point.

The second panel 14 of the first row is attached to the first panel 13 of the second row by the attachment of adjacent ends of the longitudinally extending straps 31 of the panels 13, 14, with karabiners 55, as described above.

Ends of the longitudinally extending straps 31 of the first and second panels 13, 14 of the second row are then connected to the first and second laterally extending support members 5, 6 respectively by said slings 604 and eye bolts 605 as described above. In this regard the longitudinally extending straps 31 of the first and second panels 13, 14 are sequentially attached, in the direction from the first longitudinally extending support member 3 to the second longitudinally extending support member 4, to the respective support member 5, 6.

As the second longitudinally extending sides 24 of the first and second panels 13, 14 of the second row approaches the second longitudinally extending support member 4, each laterally extending support strap 32 of the first and second panels 13, 14 is attached, at a section 102 inboard of the second longitudinally extending side 24 by a respective said clutch 900 to a respective said tensioning device 103, as described above. Each tensioning device 103 is attached to the second longitudinally extending support member 4 via a respective karabiner 221 and sling 220, as described above.

The desired amount of tension is then applied to the laterally extending support straps 32 by the tensioning devices 103 to provide sufficient tension to the platform 45 to support the load of workers working on the platform.

A longitudinal section 105, 106 of the panels 13, 14, provided towards the respective second longitudinally extending side 24 of the panels 13, 14 is folded back over itself, in the inboard direction. This folded over section defines said longitudinally extending peripheral side 300 (see FIG. 1) of the platform 45. This folded over section 105, 106 is attached to the second longitudinally extending support member 4 by the plurality of clamp assemblies 107 distributed along the longitudinal length of the second longitudinally extending side 300, as described above.

As the panels 11 to 14 are being installed, a first panel that has been attached to the support structure may be used to support a second panel that will then subsequently be attached to the support structure adjacent to the first panel. For example, the first panel, that has been attached to the support structure, may be attached to the second panel, that is not attached to the support structure, by the attachment of ends of their support straps (as described above), with the second panel folded back over the first panel. The second panel may then be pulled out from on the first panel and attached to the support structure as described above.

It will be appreciated that, in general terms, a row of panels is attached to a support member of the support structure and then adjacent rows of panels are sequentially attached, in the direction towards an opposed support member that supports said clamp assemblies 107. A side section of the panels adjacent to the opposed support member is folded inboard and clamped by the clamp assemblies 107 to substantially match the shape of the opposed support member.

It will be appreciated that the exact sequence of attachment of support straps and panels, the tensioning of support straps, etc., may be varied.

Optionally the method comprises tensioning the longitudinally extending support straps 31 with a plurality of said tensioning devices 103. In this regard, optionally as the longitudinally extending support straps 31 are sequentially attached, in the direction from the first longitudinally extending side to the second longitudinally extending side of the support structure, once each longitudinally extending strap 31 is attached to the first and second laterally extending support members 5, 6 it is tensioned with a tensioning device, preferably before the attachment of the next strap 31 in the sequence.

The described and illustrated embodiments are to be considered as illustrative and not restrictive in character, it being understood that only the preferred embodiments have been shown and described and that all changes and modifications that come within the scope of the inventions as defined in the claims are desired to be protected.

In the described embodiments the tensioning and clamping arrangements have been applied in relation to (one or both of) the longitudinally extending sides 66, 61 of the platform 45 and the laterally extending support straps 32. It will be appreciated that additionally, or additionally, the above described clamping and tensioning arrangements may be applied to, for example, the longitudinally extending support straps 31 and (one or both of) the laterally extending sides 63, 64 of the platform 45 respectively.

Furthermore, in the described embodiments, each clamp 107 is attached to the second longitudinally extending support member 4 at the same point as a respective tensioning strap 101 (via the ratchet tension 103 and the strap 104). Alternatively, one or more of the ratchet tensioner is 103 may be attached to the second longitudinally extending support member 4 at a different point along the longitudinal extent support member 4 to the clamp 107, as shown in FIG. 26.

Optionally, the side section 105, 106 of the platform 45 may pass around at least 50% of the circumference of the grip member 109. Optionally the side section of the platform 45 may pass around at least 75% of the circumference of the grip member 109. Optionally the side section 105, 106 of the platform 45 may pass around at least 90% of the circumference of the grip member 109.

At least one of the grip members 109 may be received within more than one of said clamp devices 107 that, for each of those clamp devices 107, their first and second clamping surfaces 112, 113 are movable relative to each other so as to selectively clamp the side section 105, 106 of the platform 45 between the first and/or second clamping surfaces 112, 113 and the grip member 109.

The tensioner device 103 may be arranged to controllably increase and decrease the tension in the support strap. The tensioner device 103 may be a ratchet tensioner referred to as a 'SpanSet ABS' ratchet.

The folded section 105, 106 may be folded under the remainder of the platform 45. In this respect, one or more of the clamp devices may be oriented upside down (to their orientation shown in FIG. 1) so that the folded section 105, 106 is folded under the remainder of the platform 45.

Referring to FIGS. 30 to 37 there is shown a clamp 2001. The clamp 2001 may be used in place of the clamp devices 107 of any of the above described embodiments.

The clamp 2001 comprises first and second clamping members 2002, 2003. The second clamping member 2003 is mounted on a substantially cylindrical pivot shaft 2004. A longitudinal axis of the pivot shaft 2004 forms a pivot axis 2005. The pivot axis 2005 is substantially parallel to a lateral axis 2050 of the clamp 2001.

The second clamping member 2003 is substantially rotationally fixed to the pivot shaft 2004, about the pivot axis 2005. The first clamping member 2002 is rotatably mounted on the pivot shaft 2004 and is rotatable about the pivot axis 2005 such that the clamping members 2002, 2003 are pivotable relative to each other, about the pivot axis 2005, between a first position, as shown in FIGS. 30 to 33 and a second position, as shown in FIGS. 34 to 37.

The clamping members 2002, 2003 have respective clamping surfaces 2006, 2007. The clamping surfaces 2006 of the first clamping member 2002 are opposed to the clamping surfaces 2007 of the second clamping member 2003. When the first and second clamping members 2002, 2003 are in the second position, their opposed clamping surfaces 2006, 2007 are closer together than when the clamping members 2002, 2003 are in the first position.

Each clamping member 2002, 2003 comprises a pair of laterally-spaced arms 2008, 2009. Each arm 2008, 2009 is a generally elongate thin-walled member extending in a direction substantially parallel to a longitudinal axis 2051 of the clamp 2001. Each arm 2008, 2009 is substantially parallel to each other arm 2008, 2009 and the arms 2008 of the first clamping member 2002 are laterally offset from the arms 2009 of the second clamping member 2003, as discussed in more detail below. The arms 2008 of the first clamping member 2002 are substantially aligned in the longitudinal direction 2051. Similarly, the arms 2009 of the second clamping member 2003 are substantially aligned in the longitudinal direction 2051.

The arms 2008 of the first clamping member 2002 are laterally spaced apart and are pivotally mounted on the pivot shaft 2004, for rotation relative to the pivot shaft 2004, about the pivot axis 2005. The arms 2008 of the first clamping member 2002 are mounted on laterally opposite ends of the pivot shaft 2004.

In this respect, a bore 2026 is provided in each arm 2008. Each bore 2026 extends along a longitudinal axis, through the thickness of the respective arm 2008 and has a substantially circular cross-sectional shape about its longitudinal axis. The longitudinal axis of each bore 2026 is substantially parallel to the lateral axis 2050 of the clamp 2001. The longitudinal axes of the bores 2026 are substantially aligned with each other and are substantially parallel to each other. Each laterally opposite end of the pivot shaft 2004 passes through a respective bore 2026. Each arm 2008 is retained on the pivot shaft 2004 by a respective annular retaining clip 2030 receiving within an annular groove 2031 provided in the respective end of the pivot shaft 2004.

The arms 2009 of the second clamping member 2003 are laterally spaced apart and are mounted on the pivot shaft 2004. Each arm 2009 is mounted laterally inboard of a respective arm 2008 of the second clamping member 2003 on the pivot shaft 2004. In this respect, a bore 2027 is provided in each arm 2009. Each bore 2027 extends along a longitudinal axis, through the thickness of the respective arm 2009 and has a substantially circular cross-sectional shape about its longitudinal axis. The longitudinal axis of each bore 2027 is substantially parallel to the lateral axis 2050 of the clamp 2001. The longitudinal axes of the bores 2027 are substantially aligned with each other and are substantially parallel to each other. The longitudinal axes of the bores 2027 are also substantially aligned with the longitudinal axes of the bores 2026 in the arms 2008 of the first clamping member 2002 and are of substantially the same size. Laterally opposite end regions of the pivot shaft 2004 passes through a respective bore 2027 in each arm 2009. The pivot shaft 2004 forms an interference fit with the bores 2027 such that the arms 2009 of the second clamping member 2003 are rotationally fixed relative to the pivot shaft 2004, about the pivot axis 2005.

Each arm 2008, 2009 comprises a base section 2010, 2011 and a clamping section 2012, 2013.

Each base section 2010, 2011 has the shape of an elongate plate that extends generally in a plane that is substantially perpendicular to the lateral direction 2050. Each base section 2010, 2011 is provided with a respective axially extending elongate slot 2034, 2035 (see FIG. 31). Each slot 2034, 2035 extends generally in the longitudinal direction 2051 (i.e. it has at least a component in the longitudinal direction 2051). Each slot 2034, 2035 extends along a respective longitudinal axis 2032, 2033 and extends throughout the thickness of the respective base section 2010, 2011. Each slot 2034, 2035 is defined by a respective inner surface 2036, 2037 of the base section 2010, 2011. Each slot 2034, 2035 is generally straight along its longitudinal axis 2032, 2033 and extends from a first end 2034a, 2035a, to a second end 2034b, 2035b. Each of the first and second ends 2034a, 2035a, 2034b, 2035b, is arcuate in shape, having a substantially constant radius to form the general shape of semi-circular end.

The clamping sections 2012, 2013 are provided on an opposite side of the pivot axis 2005 to the respective base sections 2010, 2011. Each clamping section 2012, 2013 is a generally elongate, thin walled member extending in a plane that is substantially perpendicular to the lateral direction, 2050. Each clamping section 2012, 2013 has a generally arcuate shape about an axis that is substantially parallel to, but offset from, the pivot axis 2005, on an opposite side of the pivot axis 2005 to the respective base sections 2010, 2011.

Each clamping section 2012, 2013 extends from an end of the respective base section 2010, 2011 proximal to the second end of the slot 2034, 2035 in the base section 2010, 2011. Each clamping section 2012 of the first clamping member 2002 is opposed to a respective clamping section 2013 of the second clamping member 2003. Accordingly, the opposed pairs of clamping sections 2012, 2013 define a generally arcuate shape (although it will be appreciated that the clamping sections 2012, 2013 are laterally offset from each other).

Each clamping section 2012, 2013 has a convex radially outward surface 2052, 2053 and a radially inward clamping surface 2006, 2007 that form said respective clamping surfaces 2006, 2007 (see FIG. 31). The clamping surfaces of the opposed pairs of clamping sections 2012, 2013 are opposed to each other.

Opposed surfaces of the clamping sections 2012, 2013 of the arms 2008, 2009 form the clamping surfaces 2006, 2007.

First and second pairs of grip elements 2014, 2015 extend laterally between respective pairs of arms 2008, 2009 of the first and second clamping members 2002, 2003. The grip elements 2014, 2015 of each pair are spaced along the length of the respective clamping surface 2006, 2007.

Each grip element 2014, 2015 comprises a substantially cylindrical roller 2016 (see FIG. 31), rotatably mounted on a generally cylindrical shaft 2017 that is rotationally fixed relative to the respective arms 2008, 2009. In this respect, the shaft 2017 is rotationally fixed within a respective pair of laterally opposed arcuate bores 2018 provided in the respective arms 2008, 2009.

The clamp 2001 further comprises an actuation assembly 2019 comprising an actuation member 2020 and a coupling member 2060 that couples the actuation member 2020 to the first and second clamping members 2002, 2003 (see FIG. 32).

The actuation member 2020 comprises a generally elongate shaft extending along a longitudinal axis 2021. The longitudinal axis 2021 is substantially parallel and coincident with the longitudinal axis 2051 of the clamp 2001. A first end of the actuation member 2020 is provided with a connecting member 2022 in the form of an eyelet provided with a bore 2023 extending generally perpendicular to the longitudinal axis and having a substantially circular cross-sectional shape. The connecting member 2022 is for connection to an anchor point on a building structure, for example by a suitable strap. The actuation member 2019 is provided, between its first and second ends with a threaded section 2024. In this respect, the actuation member 2019 is provided with an external thread 2024. Towards its second end, the actuation member 2019 is provided with a non-threaded section 2025 that is of reduced diameter compared to the threaded section 2024.

The coupling member 2060 is a generally elongate member extending along a longitudinal axis that is substantially parallel to, but offset from, the lateral axis 2050 (and the pivot axis 2005) of the clamp 2001. The coupling member 2060 has a substantially cylindrical shape, provided with first and second ends 2061, 2062 that are of reduced diameter compared to the central section of the coupling member 2060 (see FIG. 32). The coupling member 2060 is slidably mounted within the slots 2034, 2035 in the base sections 2010, 2011 of the arms 2008, 2009 of the clamping members 2002, 2003.

In more detail, the central section of the coupling member 2060 is disposed between the laterally opposed pairs of arms 2008, 2009 of the first and second clamping members 2002, 2003. Respective first and second end regions of the coupling member 2060 that are proximate to the first and second ends 2061, 2062 respectively, are received within and pass through the aligned slots 2034, 2035 of a respective pair of adjacent base sections 2010, 2011 of the arms 2008, 2009 of the clamping members 2002, 2003. The ends 2061, 2062 of the coupling member 2060 are retained within the respective slots 2034, 2035 by respective retaining rings 2063 (see FIG. 30) mounted within an annular groove 2064 in the respective ends 2061, 2062 and provided outboard of the base sections 2010 of the arms 2008 of the first clamping member 2002.

The ends 2061, 2062 of the coupling member 2060 are slidably received within said pairs of slots 2034, 2035 such that the coupling member 2060 is slideable in the longitudinal direction 2051, relative to the base sections 2010, 2011 of the first and second clamping members 2002, 2003. As explained in more detail below, as the coupling member 2060 slides along said slots 2034, 2035, it acts to rotate the first clamping member 2002 relative to the second clamping member 2003 about the pivot axis 2005, from a first position (as shown in FIGS. 30 to 33) to a second position (as shown in FIGS. 35 to 37).

In more detail, when the clamping members 2002, 2003 are in the first position, the coupling member 2060 is disposed at the second end 2034b, 2035b of the slots 2034, 2035. In this position, the clamping surfaces 2006, 2007 are relatively far apart.

When the clamping members 2002, 2003 are in the first position the longitudinal axis 2032 of each slot 2034 in the first clamping member 2002 is inclined at an oblique angle relative to the longitudinal axis 2033 of each slot 2035 in the second clamping member 2003. The longitudinal axis of each slot 2033 in the second clamping member 2003 is substantially parallel to the longitudinal axis 2021 of the actuation member 2020 (and is substantially perpendicular to the lateral axis 2050).

The coupling member 2060 is provided with an internally threaded bore 2006 provided in the central section of the coupling member 2060, which extends along an axis that is substantially parallel to and coincident with the longitudinal axis 2051 of the clamp, as well as the longitudinal axis 2021 of the actuation member 2020. The threaded section 2024 of the actuation member 2020 is received within the bore 2006 and the threaded section 2024 is engaged with the threads of the internally threaded bore 2006 in the coupling member 2060. The engagement is such that rotation of the actuation member 2020 causes the coupling member 2060 to slide axially within the slots in the base sections 2010, 2011 of the arms 2008, 2009.

In more detail, as the actuation member 2020 is rotated in a first rotational direction about its longitudinal axis 2021 (which is in a clockwise direction when viewed along the longitudinal axis 2021 in the direction from the left to the right, in the orientation shown in FIG. 30), the coupling member 2060 moves axially in the direction from the second end 2034b, 2035b of the slots 2034, 2035 towards the first end 2034a, 2035a of the slots 2034, 2035. In this respect, the end of the threaded section 2024 abuts the pivot shaft, by virtue of which it is prevented from moving in the axial direction towards the second end of the actuation shaft 2020. This provides a reaction force to move the coupling member 2060 in the opposite direction, i.e. towards the first end 2034a, 2035a of the slots 2034, 2035.

The arms 2009 of the second clamping member 2003 are rotationally fixed about the pivot axis 2005 (as discussed above). Accordingly, as the coupling member 2060 slides axially within the slots 2035 in the base sections 2011 of the arms 2009, the arms 2009 do not rotate about the pivot axis 2005 and the coupling member 2060 is constrained to move axially in the direction of the longitudinal axis of the slots 2035.

As the coupling member 2060 moves along the slots 2035 from their second end 2035b to their first end 2035a, it engages with the respective inner surfaces 2036 of the base sections 2010 that define the slots 2034, such that it acts to rotate the slots 2034 to decrease the angle of inclination between the longitudinal axes 2032, 2033 of the slots 2034, 2035. Due to the pivotal mounting of the first and second clamping members 2002, 2003 about the pivot axis 2005, this acts to rotate the opposed clamping surfaces 2006, 2007 towards each other.

Referring to FIGS. 34 to 37, the coupling member 2060 is shown in the second position. In this position, the ends 2061, 2062 of the coupling member 2060 are disposed proximal to the first ends 2034a, 2035a of the slots 2034, 2035, but displaced a small axial distance away from the first ends 2034a, 2035a towards the second ends 2034b, 2035b. When the coupling member 2060 is in the second position, the clamping surfaces 2006, 2007 are closer together than when the coupling member is in the first position.

Accordingly, the rotation of the actuation member 2020 in the first rotational direction acts to close the clamp. The threaded section 2024 of the actuation member 2020 is engaged with the internally threaded bore 2006 and the coupling member 2060 such that rotation of the actuation member 2020 is a second rotational direction (which is opposite the rotational direction of the first rotational direction—i.e. in the anti-clockwise direction when viewed looking along the longitudinal axis 2021 from the left to the right in the orientation shown in FIG. 30) about the longitudinal axis 2021, the clamping members 2012, 2013 are moved back from the second position to the first position. In this regard, it will be appreciated that as the actuation member 2020 is rotated in the second rotational direction the coupling member moves from its position proximal to the first end 2034a, 2035a of the slots 2034, 2035 towards the second end 2034b, 2035b of the slots 2034, 2035. The movement of the coupling member within the slots 2034, 2035 acts to rotate the arms 2008, 2009 of the clamping members 2002, 2003 back to the first position.

The non-threaded section 2025 of the actuation member 2020 is slidably received within a bore 2066 in the pivot shaft 2004 (see FIG. 32). The bore 2066 extends along a longitudinal axis that is coincident with and substantially parallel to the longitudinal axis 2021 of the actuation member 2020 (and the longitudinal axis 2051 of the clamp 1). The diameter of the bore 2066 is less than the external diameter of the threaded section 2024 such that the threaded section 2024 is unable to pass into the bore 2066. The bore 2066 is non-threaded. In this respect, the internal surface of the bore 2066 is a substantially smooth surface. The non-threaded section 2025 of the actuation member 2020 is slidably received within the bore 2066 such that the actuation member 2020 is able to slide in the axial direction relative to the pivot shaft 2004. Due to its threaded engagement, the actuation member 2020 is substantially fixed in the axial direction relative to the coupling member 2060, for a certain rotational position of the actuation member 2020. As the actuation member 2020 slides relative to pivot shaft 2004 by virtue of the slideable engagement of the non-threaded section 2024 in the bore 2066 in the pivot shaft 2004, the coupling member 2060 is able to move axially relative to the pivot shaft 2004 and therefore relative to the slots 2034, 2035.

Specifically, when an axial force is applied to the connecting member 2022 in the axial direction from the second end to the first end of the actuation member 2020, this acts to move the actuation member 2020, and therefore the coupling member 2060, in this axial direction by virtue of the slideable engagement of the non-threaded section 2024 of the actuation member 2020 in the bore 2066 in the pivot member 204. This acts to move the ends 2061, 2062 of the coupling member 2060 further towards the first ends 2034a, 2035a of the slots 2034, 2035. By virtue of the above described engagement of the ends 2061, 2062 of the coupling member 2060 in the slots 2034, 2035, this acts to further rotate the clamping surfaces 2006, 2007 closer together.

The above arrangement is advantageous in that when such an axial force is applied to the actuation member 2020, such as the force of people walking on a support surface that is being clamped between the clamping surfaces 2006, 2007 of the clamp 2001, this acts to increase the force of the grip of the clamping members 2002, 2003 by urging the clamping surfaces 2006, 2007 closer together, thereby providing a secure gripping arrangement.

Referring to FIGS. 38 to 41, there is shown a perspective view of a support assembly according to a further aspect of the invention. The support assembly 2070 comprises the above described clamp 2001 (shown in FIGS. 30 to 37), a grip member 2071 and a support structure 2072. The support structure may be the platform 45 described in relation to the above embodiments. The clamp 2001 and the grip member 2071 together form a clamp assembly according to an aspect of the invention.

In more detail, the clamp 2001 clamps the support structure 2072 between the clamping surfaces 2006, 2007 and the grip member 2071.

The grip member 2071 is a generally elongate solid bar extending along a longitudinal axis 2073. The grip member 2071 has the general shape of a cylinder provided with a plurality of recesses 2074 distributed circumferentially about the outer surface of the grip member 2071. Each recess 2074 is elongate and extends along a longitudinal axis that is substantially parallel to the longitudinal axis 2073 of the grip member 2071. Each recess has an arcuate cross-sectional shape that is convex, extending inwardly towards the longitudinal axis 2073 of the grip member 2071. The recesses define a plurality of protrusions 2075 disposed between adjacent recesses 2074. The outer surface of the protrusions 2075 has a generally flattened shape.

In use, an end section of the support structure 2072 is wrapped around the circumference of the grip member 2071 (as described in relation the above embodiments). The clamp 2001 is placed around the grip member 2071 and the support structure 2072, with the clamping members 2002, 2003 in the first position so as to provide sufficient clearance for the grip member 2071 and the support structure 2072 to be received between the clamping surfaces 2006, 2007 of the clamping members 2002, 2003. When the grip member 2071 and support structure 2072 are in position, the actuation member 2020 is rotated in the first rotational direction so as to move the clamping members 2002, 2003 from their first position to their second position. When the clamping members 2002, 2003 are in their second position, the clamping surfaces 2006, 2007 clamp the support structure 2072 between the clamping surfaces and the outer surface of the grip member 2071.

In addition, the clamp 2001 and the grip member 2071 are oriented such that each grip element 2014, 2015 is received within a respective recess 2074 in the grip member 2071, with the support structure 2072 disposed between the grip element 2014, 2015 and the outer surface of the grip member 2071 that defines the recess 2074. This engagement of the grip members 2014, 2015 in the recess 2074 provides a secure gripping arrangement and prevents the support structure 2072 from being pulled loose under load, in addition to providing the advantage that when an axial force is applied to the actuation member 2020, such as the force of people walking on a support surface that is being clamped between the clamping surfaces 2006, 2007 of the clamp 2001, this acts to increase the force of the grip of the clamping members 2002, 2003 by urging the clamping surfaces 2006, 2007 closer together, thereby providing a secure gripping arrangement.

It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

The invention claimed is:

1. An assembly of a platform assembly and a support structure, the platform assembly comprising a flexible platform, a plurality of support straps arranged to support the flexible platform, a plurality of clamps supported by the support structure, the plurality of clamps provided along a side of the flexible platform and clamping a side section of the flexible platform, and a plurality of tensioning devices attached to the support straps at attachment locations and arranged to tension the support straps, wherein the attachment locations of the tensioning devices are positionable independently of the position of the clamps.

2. An assembly of a platform assembly and a support structure according to claim 1 wherein the clamps are attached to the same side of the support structure as the tensioning devices.

3. An assembly of a platform assembly and a support structure according to claim 2 wherein the clamps are positioned closer to said side of the support structure than the attachment locations of the tensioning devices.

4. An assembly of a platform assembly and a support structure according to claim 1 wherein at least a section of the flexible platform is folded to form a folded section, the folded section forming the side section of the flexible platform that is clamped by the plurality of clamps.

5. An assembly of a platform assembly and a support structure according to claim 1 wherein each support strap is attached to the support structure by an anchor member that provides a reaction force to the force exerted on the support strap by a said tensioning device.

6. An assembly of a platform assembly and a support structure according to claim 1 wherein each support strap is attached to a first and second said tensioning device at first and second attachment locations respectively, the first and second tensioning devices being attached to first and second sides of the support structure respectively and arranged to apply opposed forces on the strap so as to tension the strap.

7. An assembly of a platform assembly and a support structure according to claim 1 wherein the plurality of clamps form a plurality of sets of clamps, each set of clamps being supported by a respective side of the support structure and being provided along a respective side of the flexible platform and clamping a respective side section of the flexible platform.

8. An assembly of a platform assembly and a support structure according to claim 1 wherein the plurality of clamps form a plurality of sets of clamps, each set of clamps being supported by a respective side of the support structure and being provided along a respective side of the flexible platform and clamping a respective side section of the flexible platform, and wherein the plurality of tensioning devices form a plurality of sets of tensioning devices, attached to the support straps at attachment locations and arranged to tension the support straps, each set of clamps being attached to the same side of the support structure as a set of tensioning devices, wherein the attachment locations of the tensioning devices of each set are positionable independently of the position of the clamps of the set of clamps that is attached to the same side of the support structure.

9. An assembly of a platform assembly and a support structure according to claim 1 wherein each clamp comprises first and second clamping surfaces and a grip member disposed between the first and second clamping surfaces, the first and second clamping surfaces being movable relative to each other so as to selectively clamp the respective side section of the flexible platform between the first and/or second clamping surfaces and a peripheral surface of the grip member.

10. An assembly of a platform assembly and a support structure according to claim 1 wherein the support straps are arranged to form a grid.

11. An assembly of a platform assembly and a support structure according to claim 1 wherein each support strap is attached to the flexible platform, towards a side of the flexible platform adjacent the side of the support structure, at a support strap attachment section and the support strap attachment sections are located between the attachment locations at which the tensioning devices are attached to the support straps and the side of the support structure.

12. An assembly of a platform assembly and a support structure according to claim 1 wherein the flexible platform comprises a plurality of panels.

13. An assembly of a platform assembly and a support structure according to claim 1 wherein each tensioning device comprises a tensioner and an attachment member that attaches the tensioner to a support strap.

14. An assembly of a platform assembly and a support structure according to claim 1 wherein the flexible platform assembly is attached to a support member of the support structure by at least one sling, the at least one sling comprising a loop of material defining first and second looped ends, the at least one sling passing around the support member, with the second looped end passed through the first looped end such that a force applied to the second looped end, in a direction away from the support member, acts to tighten the sling around the support member, wherein the second looped end is folded back on itself as it is passed through the first looped end such that rotation of the sling about the support member varies the distance between the second looped end and the support member.

15. A method of a assembling the platform assembly of claim 1, the method comprising attaching the plurality of tensioning devices to the support straps at attachment locations and tensioning the support straps with the tensioning devices, supporting the plurality of clamps by the support structure, providing the plurality of clamps along the side of the flexible platform and clamping a side section of the platform, wherein the attachment locations of the tensioning devices are positioned independently of the position of the clamps.

16. The method of assembling according to claim 15 wherein the clamps are attached to the same side of the support structure as the tensioning devices and the clamps are positioned closer to said side of the support structure than the attachment locations of the tensioning devices.

17. The method of assembling according to claim 15 wherein at least a section of the flexible platform is folded to form a folded section, the folded section forming the side section of the platform that is clamped by the plurality of clamps.

18. The method of assembling according to claim 15 wherein the plurality of clamps form a plurality of sets of clamps, the method comprising supporting each set of clamps by a respective side of the support structure and providing each set of clamps along a respective side of the flexible platform and clamping a respective side section of the platform.

19. The method of assembling according to claim 15 wherein the support structure comprises first and second longitudinally extending sides spaced apart in a lateral direction and first and second laterally extending sides spaced apart in the longitudinal direction, the support straps comprising a first set of support straps that extend in the longitudinal direction and are spaced in the lateral direction and a second set of support straps that extend in the lateral direction and are spaced in the longitudinal direction, wherein the method comprises attaching a first section of each strap of the second set of straps to the first longitudinally extending side of the support structure, sequentially attaching, in the direction from the first longitudinally extending side to the second longitudinally extending side of the support structure, each strap of the first set to the first and second laterally extending sides of the support structure, attaching the plurality of tensioning devices to respective second sections of the straps of the second set at said attachment locations, tensioning the second set of straps with the tensioning devices, supporting the clamps along the second longitudinally extending side of the support structure and clamping a side of the flexible platform adjacent the second longitudinally extending side of the support member with said clamps.

20. The method of assembling according to claim 15 wherein the flexible platform comprises a plurality of panels and the method further comprises attaching the plurality of said panels together to form said flexible platform.

* * * * *